United States Patent
Zhuo et al.

(10) Patent No.: US 12,238,691 B2
(45) Date of Patent: Feb. 25, 2025

(54) TIME DOMAIN RESOURCE FORMAT CONFIGURATION METHOD, COMMUNICATION APPARATUS, AND COMMUNICATION SYSTEM

(71) Applicant: Huawei Technologies Co., Ltd., Shenzhen (CN)

(72) Inventors: Yibin Zhuo, Shenzhen (CN); Jing Liu, Shanghai (CN); Mingzeng Dai, Shenzhen (CN); Yuanping Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 357 days.

(21) Appl. No.: 17/738,938

(22) Filed: May 6, 2022

(65) Prior Publication Data

US 2022/0272699 A1    Aug. 25, 2022

Related U.S. Application Data

(63) Continuation of application No. PCT/CN2019/116771, filed on Nov. 8, 2019.

(51) Int. Cl.
*H04W 72/04*  (2023.01)
*H04L 1/1607*  (2023.01)
*H04W 72/0446*  (2023.01)

(52) U.S. Cl.
CPC ....... *H04W 72/0446* (2013.01); *H04L 1/1614* (2013.01)

(58) Field of Classification Search
CPC .................... H04W 72/0446; H04L 1/1614
See application file for complete search history.

(56) References Cited

U.S. PATENT DOCUMENTS

| | | | |
|---|---|---|---|
| 2013/0272170 A1* | 10/2013 | Chatterjee | H04W 24/02 370/280 |
| 2019/0313433 A1 | 10/2019 | Abedini et al. | |
| 2020/0145993 A1* | 5/2020 | Abedini | H04L 5/0094 |

(Continued)

FOREIGN PATENT DOCUMENTS

CN    110381583 A    10/2019

OTHER PUBLICATIONS

Ericsson, "IAB resource configuration and multiplexing," 3GPP TSG-RAN WG1 Meeting #98, Prague, Czech Republic, R1-1909026, Total 11 pages, XP051765630, 3rd Generation Partnership Project, Valbonne, France (Aug. 26-30, 2019).

(Continued)

*Primary Examiner* — Brenda H Pham
(74) *Attorney, Agent, or Firm* — Leydig, Voit & Mayer, Ltd.

(57) ABSTRACT

A time domain resource format configuration method is provided. In addition to configuring time domain resources for an integrated access and backhaul (IAB) node based on a downlink-flexible-uplink time domain resource format, an IAB donor may further configure time domain resources for the IAB node based on an uplink-flexible-downlink time domain resource format, so that the time domain resources can be flexibly configured for the IAB node, to improve utilization and a throughput of the time domain resources in an IAB network.

18 Claims, 16 Drawing Sheets

(56) References Cited

U.S. PATENT DOCUMENTS

2020/0146025 A1* 5/2020 Choi ................. H04W 72/1263

OTHER PUBLICATIONS

Nokia et al., "Mechanisms for resource multiplexing among backhaul and access links," 3GPP TSG RAN WG1 Meeting #98bis, Chongqing, China, R1-1911194, Total pp. 14, XP051789965, 3rd Generation Partnership Project, Valbonne, France (Oct. 14-20, 2019).
AT&T, Qualcomm, "Summary #5 of 7.2.3.2—Mechanisms for resource multiplexing among backhaul and access links," 3GPP TSG RAN WG1 Meeting #98bis, Chongqing, China, R1-1911651, Oct. 20, 2019, total 17 pages, 3rd Generation Partnership Project, Valbonne, France (Oct. 14-20, 2019).
CMCC, "Discussion on resource multiplexing among backhaul and access links," 3GPP TSG RAN WG1 #98bis, Chongqing, China, R1-1910162, Oct. 20, 2019, total 5 pages, 3rd Generation Partnership Project, Valbonne, France (Oct. 14-20, 2019).
"3rd Generation Partnership Project; Technical Specification Group Radio Access Network; NR; Radio Resource Control (RRC) protocol specification (Release 15)," 3GPP TS 38.331 V15.2.1, total 303 pages, 3rd Generation Partnership Project, Valbonne, France (Jun. 2018).
Samsung, "Resource Multiplexing between Backhaul and Access Links," 3GPP TSG RAN WG1 #97, Reno, USA, R1-1906932, Total 5 pages, 3rd Generation Partnership Project, Valbonne, France (May 13-17, 2019).

* cited by examiner

TIME DOMAIN RESOURCE FORMAT CONFIGURATION METHOD, COMMUNICATION APPARATUS, AND COMMUNICATION SYSTEM

CROSS-REFERENCE TO RELATED APPLICATIONS

This application is a continuation of International Application No. PCT/CN2019/116771, filed on Nov. 8, 2019, the disclosures of which is incorporated herein by reference in its entirety.

TECHNICAL FIELD

Embodiments of this application relate to the field of communication technologies, and in particular, to a time domain resource format configuration method, a communication apparatus, and a communication system.

BACKGROUND

Compared with a 4th generation mobile communication system, 5th generation (5G) mobile communication imposes stricter requirements on various network performance indicators in an all-round way. For example, a capacity indicator needs to be increased by 1000 times, wider coverage is required, and ultra-high reliability and an ultra-low delay are required. An integrated access and backhaul (IAB) system emerges to provide a flexible and convenient access and backhaul service for a terminal by using a large quantity of densely deployed nodes, to improve coverage and satisfy a stricter performance indicator of 5G.

Because an IAB network includes a large quantity of nodes, and a network topology is complex, how to flexibly configure time domain resources and improve utilization and a throughput of the time domain resources in the IAB network is a problem to be urgently resolved.

SUMMARY

Embodiments of this application provide a time domain resource format configuration method, a communication apparatus, and a communication system, so that time domain resources can be configured in one or more periodicities based on an uplink-flexible-downlink time domain resource format, to flexibly configure the time domain resources, and improve utilization and a throughput of the time domain resources in an IAB network.

According to a first aspect, a time domain resource format configuration method is provided. The method may be performed by an IAB donor, a CU of the IAB donor, a chip in the IAB donor, or a chip in the CU of the IAB donor. The method includes the following steps.

An IAB donor obtains first time domain resource format information, where the first time domain resource format information indicates that time domain resources in a first periodicity are distributed in an order of an uplink time domain resource, a flexible time domain resource, and a downlink time domain resource; and the IAB donor sends the first time domain resource format information to a first IAB node.

The IAB donor configures the time domain resources for the IAB node based on an uplink-flexible-downlink time domain resource format, to flexibly configure the time domain resources for the IAB node, and improve utilization and a throughput of the time domain resources in an IAB network.

Optionally, in the method in the first aspect, the first time domain resource format information may be understood as follows: When there is an uplink time domain resource in the first periodicity, the first periodicity starts with the uplink time domain resource, then a flexible time domain resource, and finally a downlink time domain resource. When there is no uplink time domain resource, the first periodicity starts with a flexible time domain resource, and then a downlink time domain resource. When there is no flexible time domain resource, all the time domain resources in the first periodicity are downlink time domain resources.

Optionally, in the method in the first aspect, the first time domain resource format information includes a bitmap, the bitmap includes at least one bit, the at least one bit is in one-to-one correspondence with at least one periodicity, and each bit indicates that time domain resources in a periodicity corresponding to the bit are distributed in an order of a downlink time domain resource, a flexible time domain resource, and an uplink time domain resource or distributed in the order of an uplink time domain resource, a flexible time domain resource, and a downlink time domain resource; and the at least one periodicity includes the first periodicity, the at least one bit includes a first bit, and the first bit indicates that the time domain resources in the first periodicity are distributed in the order of an uplink time domain resource, a flexible time domain resource, and a downlink time domain resource.

Optionally, the bitmap may be repeatedly used. For example, when the bitmap includes 4 bits, the bitmap may indicate a periodicity 1 to a periodicity 4 and a periodicity 5 to a periodicity 8.

In other words, a time domain resource format of one or more periodicities may be indicated by using the bitmap, and periodicities that need to be configured based on the uplink-flexible-downlink time domain resource format and periodicities that need to be configured based on a downlink-flexible-uplink time domain resource format are determined based on an actual requirement, to flexibly configure the time domain resources for the IAB node, and improve utilization and a throughput of the time domain resources in the IAB network. In addition, in the bitmap manner, an index of a specific periodicity does not need to be indicated, thereby saving wireless communication resources.

Optionally, in the method in the first aspect, the first time domain resource format information indicates that time domain resources in each of T1 consecutive periodicities are distributed in an order of a downlink time domain resource, a flexible time domain resource, and an uplink time domain resource, and that time domain resources in each of T2 consecutive periodicities immediately following the T1 consecutive periodicities are distributed in the order of an uplink time domain resource, a flexible time domain resource, and a downlink time domain resource, the T2 consecutive periodicities include the first periodicity, and both T1 and T2 are positive integers greater than or equal to 1.

Optionally, the first time domain resource format information further includes one or both of a parameter T1 and a parameter T2.

T1 and T2 are defined, so that the IAB node can determine periodicities that need to be configured based on the uplink-flexible-downlink time domain resource format and periodicities that need to be configured based on the downlink-flexible-uplink time domain resource format, and an index of a periodicity does not need to be indicated. Therefore, wireless communication resources can be saved.

Optionally, in the method in the first aspect, the first time domain resource format information includes indication information of the first periodicity, indication information of a length of the uplink time domain resource, indication information of a length of the downlink time domain resource, and uplink priority indication information, and the uplink priority indication information indicates that the uplink time domain resource is at the beginning of the first periodicity.

When the length of the uplink time domain resource and the length of the downlink time domain resource are indicated, whether the downlink time domain resource or the uplink time domain resource is at the beginning of the periodicity may be indicated. Optionally, in this method, the first time domain resource format information is applicable to a plurality of periodicities, that is, the first periodicity may be a plurality of periodicities, for example, may be a periodicity 1, a periodicity 2, a periodicity 3, and the like. The first time domain resource format information includes the uplink priority indication information, to indicate that time domain resource formats of the periodicity 1, the periodicity 2, and the periodicity 3 are all uplink-flexible-downlink. Therefore, a small quantity of bits are used to indicate time domain resource formats of a plurality of periodicities, and wireless communication resources can be saved. Optionally, in this method, the first time domain resource format information is applicable to only one periodicity, for example, a periodicity 1.

Optionally, in the method in the first aspect, the first time domain resource format information includes indication information of the first periodicity, indication information of a length of the uplink time domain resource, and indication information of a length of the downlink time domain resource; the indication information of the length of the uplink time domain resource indicates the length of the uplink time domain resource, and the uplink time domain resource is at the beginning of the first periodicity; and the indication information of the length of the downlink time domain resource indicates the length of the downlink time domain resource, and the downlink time domain resource is at the end of the first periodicity.

When the length of the uplink time domain resource and the length of the downlink time domain resource are indicated, it may be indicated that the uplink time domain resource is at the beginning of the first periodicity (according to an explicit indication method, for example, by adding indication information, or according to an implicit indication method, for example, being predefined in a protocol) and the downlink time domain resource is at the end of the first periodicity (according to an explicit indication method, for example, by adding indication information, or according to an implicit indication method, for example, being predefined in a protocol).

Optionally, in the method in the first aspect, alternatively, the first time domain resource format information includes indication information, and the indication information may indicate that the time domain resources in the first periodicity are distributed in one of the following orders: an uplink time domain resource, a flexible time domain resource, and a downlink time domain resource; an uplink time domain resource, a downlink time domain resource, and a flexible time domain resource; a flexible time domain resource, a downlink time domain resource, and an uplink time domain resource; a flexible time domain resource, an uplink time domain resource, and a downlink time domain resource; a downlink time domain resource, an uplink time domain resource, and a flexible time domain resource; or a downlink time domain resource, a flexible time domain resource, and an uplink time domain resource.

Optionally, the first time domain resource format information may further include indication information of the first periodicity, indication information of a length of the uplink time domain resource, and indication information of a length of the downlink time domain resource.

Optionally, in the method in the first aspect, the first periodicity may be a slot or n milliseconds, where n is a positive number.

Optionally, in the method in the first aspect, the first time domain resource format information is further used to indicate a resource type of one or more of the uplink time domain resource, the flexible time domain resource, and the downlink time domain resource in the first periodicity, and the resource type includes a hard type, a soft type, or a not-available N/A type. The hard type indicates that a resource is available. The soft type indicates that availability of a resource is to be determined and needs to wait for an indication from a parent node or the IAB donor. The N/A type indicates that a resource is not available (not available).

Optionally, in the method in the first aspect, the uplink time domain resource in the time domain resources in the first periodicity includes X consecutive uplink symbols, the flexible time domain resource includes Y consecutive flexible symbols, and the downlink time domain resource includes Z consecutive downlink symbols, where X, Y, and Z are all integers greater than or equal to 0.

Optionally, in the method in the first aspect, the first time domain resource format information is carried in system information block SIB1 signaling (in this case, the first time domain resource format information is configured at a cell granularity, and may be understood as taking effect for a plurality of IAB nodes. For example, MTs of a plurality of IAB nodes access a DU of a parent node, and time domain resource format information at the cell granularity may be sent to the MTs of the plurality of IAB nodes, so that the information takes effect for all the MTs of the plurality of the IAB nodes.). Alternatively, the first time domain resource format information is carried in radio resource control RRC signaling (the RRC signaling may be configured at an IAB node granularity. In this case, the first time domain resource format information is configured at the IAB node granularity, and may be understood as taking effect for one IAB node. For example, time domain resource format information at the IAB node granularity is sent to only one IAB node, so that the information takes effect for only the IAB node.).

Optionally, in the method in the first aspect, the first time domain resource format information is time domain resource format information of an MT of the first IAB node, the first time domain resource format information indicates that time domain resources of the MT of the first IAB node are distributed in the order of an uplink time domain resource, a flexible time domain resource, and a downlink time domain resource, and that the IAB donor sends the first time domain resource format information to a first IAB node includes:

The IAB donor sends the first time domain resource format information to the MT of the first IAB node.

Optionally, the method further includes:

The IAB donor receives the first time domain resource format information from a DU of a parent node of the first IAB node.

In other words, the time domain resource format information of the MT of the first IAB node is generated by the DU of the parent node of the first IAB node. Optionally, the parent node of the first IAB node may generate the time domain resource format information of the MT of the first IAB node based on time domain resource format information of the DU of the parent node and/or time domain resource format information of a DU of the first IAB node.

Optionally, the method further includes:

The IAB donor sends second time domain resource format information to a DU of the first IAB node, where the second time domain resource format information indicates that time domain resources of the DU of the first IAB node in the first periodicity are distributed in the order of a downlink time domain resource, a flexible time domain resource, and an uplink time domain resource.

In the first periodicity, the time domain resource format of the DU of the first IAB node is downlink-flexible-uplink, and the time domain resource format of the MT of the first IAB node is uplink-flexible-downlink. The time domain resource format of the DU of the first IAB node and the time domain resource format of the MT of the first IAB node are exactly opposite. A time domain resource is multiplexed for a link between the first IAB node and the parent node and a link between the first IAB node and a child node. In other words, the MT and the DU of the first IAB node may simultaneously perform sending or receiving. This improves utilization efficiency and a throughput of the time domain resource.

Optionally, in the method in the first aspect, the time domain resource format information is carried in an F1 application protocol (F1AP) message.

Optionally, in the method in the first aspect, the first time domain resource format information is time domain resource format information of a DU of the first IAB node, the first time domain resource format information indicates that time domain resources of the DU of the first IAB node are distributed in the order of an uplink time domain resource, a flexible time domain resource, and a downlink time domain resource, and that the IAB donor sends the time domain resource format information to a first IAB node includes:

The IAB donor sends the first time domain resource format information to the DU of the first IAB node.

Optionally, the method in the first aspect further includes:

The IAB donor sends second time domain resource format information to an MT of the first IAB node, where the second time domain resource format information indicates that time domain resources of the MT of the first IAB node in the first periodicity are distributed in the order of a downlink time domain resource, a flexible time domain resource, and an uplink time domain resource.

In the first periodicity, the time domain resource format of the MT of the first IAB node is downlink-flexible-uplink, and the time domain resource format of the DU of the first IAB node is uplink-flexible-downlink. The time domain resource format of the DU of the first IAB node and the time domain resource format of the MT of the first IAB node are exactly opposite. A time domain resource is multiplexed for a link between the first IAB node and the parent node and a link between the first IAB node and a child node. In other words, the MT and the DU of the first IAB node may simultaneously perform sending or receiving. This improves utilization efficiency and a throughput of the time domain resource.

According to a second aspect, a time domain resource format configuration method is provided. The method may be performed by an IAB node or a chip in the IAB node. The method includes the following steps.

A first IAB node receives first time domain resource format information from an IAB donor, where the first time domain resource format information indicates that time domain resources in a first periodicity are distributed in an order of an uplink time domain resource, a flexible time domain resource, and a downlink time domain resource; and the first IAB node determines that the time domain resources in the first periodicity are distributed in the order of an uplink time domain resource, a flexible time domain resource, and a downlink time domain resource.

Optionally, in the method in the second aspect, the first time domain resource format information includes a bitmap, the bitmap includes at least one bit, the at least one bit is in one-to-one correspondence with at least one periodicity, and each bit indicates that time domain resources in a periodicity corresponding to the bit are distributed in an order of a downlink time domain resource, a flexible time domain resource, and an uplink time domain resource or distributed in the order of an uplink time domain resource, a flexible time domain resource, and a downlink time domain resource; and the at least one periodicity includes the first periodicity, the at least one bit includes a first bit, and the first bit indicates that the time domain resources in the first periodicity are distributed in the order of an uplink time domain resource, a flexible time domain resource, and a downlink time domain resource.

Optionally, in the method in the second aspect, the first time domain resource format information indicates that time domain resources in each of T1 consecutive periodicities are distributed in an order of a downlink time domain resource, a flexible time domain resource, and an uplink time domain resource, and that time domain resources in each of T2 consecutive periodicities immediately following the T1 consecutive periodicities are distributed in the order of an uplink time domain resource, a flexible time domain resource, and a downlink time domain resource, the T2 consecutive periodicities include the first periodicity, and both T1 and T2 are positive integers greater than or equal to 1.

Optionally, in the method in the second aspect, the first time domain resource format information further includes one or both of a parameter T1 and a parameter T2.

Optionally, in the method in the second aspect, the first time domain resource format information includes indication information of the first periodicity, indication information of a length of the uplink time domain resource, indication information of a length of the downlink time domain resource, and uplink priority indication information, and the uplink priority indication information indicates that the uplink time domain resource is at the beginning of the first periodicity.

Optionally, in the method in the second aspect, the first time domain resource format information includes indication information of the first periodicity, indication information of a length of the uplink time domain resource, and indication information of a length of the downlink time domain resource; the indication information of the length of the uplink time domain resource indicates the length of the uplink time domain resource, and the uplink time domain resource is at the beginning of the first periodicity; and the indication information of the length of the downlink time domain resource indicates the length of the downlink time domain resource, and the downlink time domain resource is at the end of the first periodicity.

Optionally, in the method in the second aspect, the first time domain resource format information is further used to indicate a resource type of one or more of the uplink time domain resource, the flexible time domain resource, and the downlink time domain resource in the first periodicity, and the resource type includes a hard type, a soft type, or a not-available N/A type.

Optionally, in the method in the second aspect, the uplink time domain resource in the time domain resources in the first periodicity includes X consecutive uplink symbols, the flexible time domain resource includes Y consecutive flexible symbols, and the downlink time domain resource includes Z consecutive downlink symbols, where X, Y, and Z are all integers greater than or equal to 0.

Optionally, in the method in the second aspect, the first time domain resource format information is carried in system information block (SIB1) signaling or radio resource control RRC signaling.

Optionally, in the method in the second aspect, the first time domain resource format information is time domain resource format information of an MT of the first IAB node, the first time domain resource format information indicates that time domain resources of the MT of the first IAB node are distributed in the order of an uplink time domain resource, a flexible time domain resource, and a downlink time domain resource, and that a first IAB node receives first time domain resource format information from an IAB donor includes:

The MT of the first IAB node receives the first time domain resource format information from the IAB donor.

Optionally, after the MT of the first IAB node receives the first time domain resource format information, the first time domain resource format information takes effect (In this embodiment of this application, that the first time domain resource format information takes effect may be understood as that uplink and downlink transmission may be performed by using the time domain resource format.).

Optionally, the method in the second aspect further includes:

A DU of the first IAB node receives second time domain resource format information from the IAB donor, where the second time domain resource format information indicates that time domain resources of the DU of the first IAB node in the first periodicity are distributed in the order of a downlink time domain resource, a flexible time domain resource, and an uplink time domain resource.

Optionally, in the method in the second aspect, after the DU of the first IAB node receives the second time domain resource format information, the MT of the first IAB node receives the first time domain resource format information, and after the MT of the first IAB node receives the first time domain resource format information, the first time domain resource format information and the second time domain resource format information take effect.

Alternatively, optionally, after the MT of the first IAB node receives the first time domain resource format information, the DU of the first IAB node receives the second time domain resource format information, and after the DU of the first IAB node receives the second time domain resource format information, the first time domain resource format information and the second time domain resource format information take effect. It may be understood that the first IAB node may receive the first time domain resource format information and the second time domain resource format information at different moments. The first time domain resource format information and the second time domain resource format information take effect only when the first IAB node receives the first time domain resource format information and the second time domain resource format information. In this way, a conflict caused by different moments at which the first time domain resource format information and the second time domain resource format information take effect can be avoided.

Optionally, in the method in the second aspect, the time domain resource format information is carried in an F1AP message.

Optionally, in the method in the second aspect, the first time domain resource format information is time domain resource format information of a DU of the first IAB node, the first time domain resource format information indicates that time domain resources of the DU of the first IAB node are distributed in the order of an uplink time domain resource, a flexible time domain resource, and a downlink time domain resource, and that a first IAB node receives first time domain resource format information from an IAB donor includes:

The DU of the first IAB node receives the first time domain resource format information from the IAB donor.

Optionally, in the method in the second aspect, an MT of the first IAB node receives second time domain resource format information from the IAB donor, where the second time domain resource format information indicates that time domain resources of the MT of the first IAB node in the first periodicity are distributed in the order of a downlink time domain resource, a flexible time domain resource, and an uplink time domain resource.

Optionally, in the method in the second aspect, after the DU of the first IAB node receives the first time domain resource format information, the MT of the first IAB node receives the second time domain resource format information, and after the MT of the first IAB node receives the second time domain resource format information, the first time domain resource format information and the second time domain resource format information take effect.

Alternatively, optionally, after the MT of the first IAB node receives the second time domain resource format information, the DU of the first IAB node receives the first time domain resource format information, and after the DU of the first IAB node receives the first time domain resource format information, the first time domain resource format information and the second time domain resource format information take effect. It may be understood that the first IAB node may receive the first time domain resource format information and the second time domain resource format information at different moments. The first time domain resource format information and the second time domain resource format information take effect only when the first IAB node receives the first time domain resource format information and the second time domain resource format information. In this way, a conflict caused by different moments at which the first time domain resource format information and the second time domain resource format information take effect can be avoided.

Optionally, in the method in the second aspect, when the first IAB node receives third time domain resource format information from the IAB donor, and/or sends the third time domain resource format information to a child node of the first IAB node, the first time domain resource format information takes effect, where the third time domain resource format information is time domain resource format configuration information of an MT of the child node of the first IAB node.

The IAB donor may send the time domain resource format information of the MT of the child node to the MT of the child node of the first IAB node by using the first IAB node, so that the first IAB node may obtain the time domain resource format information of the MT of the child node. The first time domain resource format information takes effect only when the first IAB node receives the third time domain resource format information from the IAB donor and/or sends the third time domain resource format information to the child node of the first IAB node. This can ensure that the time domain resource format information of the DU of the first IAB node and the time domain resource format information of the MT of the child node simultaneously take effect on the link between the first IAB node and the child node, so that a conflict or a data loss caused by asynchronous effectiveness can be avoided.

According to a third aspect, an embodiment of this application provides an apparatus. The apparatus provided in this application has a function of implementing the IAB donor or the IAB node in the foregoing method aspect, and includes corresponding means (means) configured to perform the steps or the functions described in the foregoing method aspects according to the first aspect to the second aspect. The steps or the functions may be implemented by using software, hardware, or a combination of hardware and software.

According to a fourth aspect, an embodiment of this application provides a communication apparatus. The communication apparatus may be an IAB donor, a chip in the IAB donor, an IAB donor CU, or a chip in the IAB donor CU. The communication apparatus includes a processor, and the processor is configured to execute a computer program or instructions, to enable the communication apparatus to perform the method in the first aspect.

Optionally, the communication apparatus further includes a memory. The processor is coupled to the memory, the memory is configured to store the computer program or the instructions, and the processor is configured to execute the computer program or the instructions in the memory.

Optionally, the communication apparatus may further include a communication unit. The communication unit is configured to communicate with another device or another component in the communication apparatus. For example, the communication apparatus is an IAB donor, and the communication unit includes a transceiver and an antenna of the IAB donor. For example, the communication apparatus is a chip in the IAB donor, and the communication unit is an input/output circuit or an interface of the chip.

According to a fifth aspect, an embodiment of this application provides a communication apparatus. The communication apparatus may be an IAB node or a chip in the IAB node. The communication apparatus includes a processor, and the processor is configured to execute a computer program or instructions, to enable the communication apparatus to perform the method in the second aspect.

Optionally, the communication apparatus further includes a memory. The processor is coupled to the memory, the memory is configured to store the computer program or the instructions, and the processor is configured to execute the computer program or the instructions in the memory.

Optionally, the communication apparatus may further include a communication unit. The communication unit is configured to communicate with another device or another component in the communication apparatus. For example, the communication apparatus is an IAB node, and the communication unit includes a transceiver and an antenna of the IAB node. For example, the communication apparatus is a chip in the IAB node, and the communication unit is an input/output circuit or an interface of the chip.

According to a sixth aspect, an embodiment of this application provides a chip. The chip includes a processor and an interface circuit, and the interface circuit is coupled to the processor. The processor is configured to execute a computer program or instructions, to implement the method in either the first aspect or the second aspect. The interface circuit is configured to communicate with a module other than the chip.

According to a seventh aspect, an embodiment of this application provides a computer storage medium. The computer storage medium stores a program used to implement the method in either the first aspect or the second aspect. When the program is run in a wireless communication apparatus, the wireless communication apparatus is enabled to perform the method in either the first aspect or the second aspect.

According to an eighth aspect, an embodiment of this application provides a computer program product. The program product includes a program. When the program is run, the method in either the first aspect or the second aspect is performed.

According to a ninth aspect, an embodiment of this application provides a communication system. The communication system includes the IAB donor (or the chip in the IAB donor) in the method in the first aspect and the IAB node (or the chip in the IAB node) in the method in the second aspect. Alternatively, the communication system includes the communication apparatus in the fourth aspect and the communication apparatus in the fifth aspect.

According to the method in embodiments of this application, time domain resources can be configured in one or more periodicities based on an uplink-flexible-downlink time domain resource format, to flexibly configure the time domain resources, and improve utilization and a throughput of the time domain resources in an IAB network.

BRIEF DESCRIPTION OF DRAWINGS

To describe the technical solutions in embodiments of this application or in the background more clearly, the following briefly describes the accompanying drawings for describing embodiments of this application or the background.

DESCRIPTION OF EMBODIMENTS

The following describes embodiments of this application with reference to the accompanying drawings in embodiments of this application.

Figure 1:
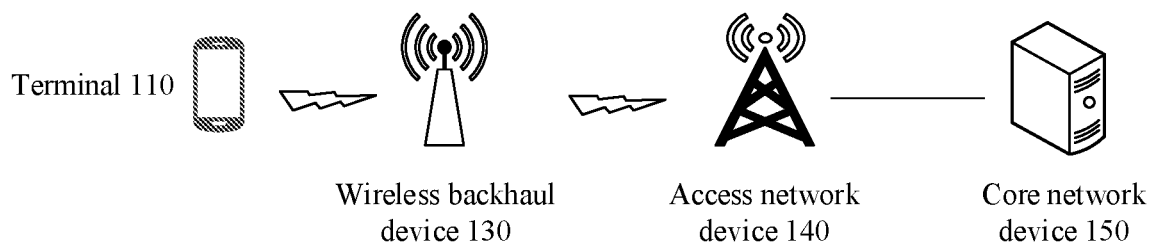
FIG. 1 is an architectural diagram of a mobile communication system according to an embodiment of this application.

FIG. 1 is an architectural diagram of a mobile communication system 100 according to an embodiment of this application. The mobile communication system 100 includes at least one terminal (for example, a terminal 110 and a terminal 120 in FIG. 1), at least one wireless backhaul device (for example, a wireless backhaul device 130 in FIG. 1), at least one access network device (for example, an access network device 140 in FIG. 1), and at least one core network device (for example, a core network device 150 in FIG. 1).

In the foregoing communication system, the terminal is connected to the wireless backhaul device in a wireless manner, and the wireless backhaul device is connected to the access network device in a wireless manner, which may be directly connected to the access network device or indirectly connected to the access network device by using another wireless backhaul device. The access network device may be connected to the core network device in a wired or wireless manner. For example, in FIG. 1, the terminal 110 is connected to the wireless backhaul device 130 in a wireless manner, the wireless backhaul device 130 is directly connected to the access network device 140 or is connected to the access network device 140 by using another wireless backhaul device, and the access network device 140 is connected to the core network device 150 in a wired manner.

The communication system in this embodiment of this application may be a communication system that supports a fourth generation (4G) access technology, for example, a long term evolution (LTE) access technology. Alternatively, the communication system may be a communication system that supports a fifth generation (5G) access technology, for example, a new radio (NR) access technology. Alternatively, the communication system may be a communication system that supports a plurality of wireless technologies, for example, a communication system that supports both an LTE technology and an NR technology. In addition, the communication system may alternatively be applicable to a future-oriented communication technology.

The terminal in this embodiment of this application may be a device that provides voice or data connectivity for a user, and the terminal may be referred to as user equipment (UE), a mobile station, a subscriber unit, a station, terminal equipment (TE), and the like. The terminal may be a cellular phone, a personal digital assistant (PDA), a wireless modem, a handheld device, a laptop computer, a cordless phone, a wireless local loop (WLL) station, a pad, and the like. With development of wireless communication technologies, any device that can access a wireless communication network, communicate with a wireless network side, or communicate with another object by using a wireless network may be the terminal in this embodiment of this application, for example, a terminal and a vehicle in intelligent transportation, a household device in a smart household, an electricity meter reading instrument or a voltage monitoring instrument in a smart grid, an environment monitoring instrument, a video surveillance instrument in an intelligent security network, or a cash register. The terminal may be stationary or mobile.

The access network device in this embodiment of this application may be a device on an access network side that is configured to support the terminal in accessing the communication system. The access network device may be referred to as a base station (BS), for example, an evolved NodeB (eNB) in a communication system with a 4G access technology, a next generation NodeB (gNB) in a communication system with a 5G access technology, a transmission reception point (TRP), a relay node, or an access point (AP). Alternatively, the access network device may be referred to as a donor node, an IAB donor, a donor gNB (DgNB), or the like.

In a possible manner, because a future access network may be implemented by using a cloud radio access network (C-RAN) architecture, in a possible manner, a protocol stack architecture and a function of a conventional access network device are divided into two parts. One part is referred to as a centralized unit (CU), and the other part is referred to as a distributed unit (DU). One CU may be connected to one DU, or a plurality of DUs may share one CU to reduce costs and facilitate network expansion. The CU and the DU may be split based on a protocol stack. In a possible manner, a radio resource control (RRC) layer, a service data mapping protocol stack (service data adaptation protocol, SDAP) layer, and a packet data convergence protocol (PDCP) layer are deployed in the CU, and a radio link control (RLC) layer, a media access control (MAC) layer, and a physical layer are deployed in the DU.

The core network device in this embodiment of this application may control one or more access network devices, uniformly manage resources in a system, or may configure a resource for the terminal. For example, the core network device may be a mobility management entity (MME) or a serving gateway (SGW) in the communication system with the 4G access technology, or an access and mobility management function (AMF) network element or a user plane function (UPF) network element in the communication system with the 5G access technology.

The wireless backhaul node in this embodiment of this application may be a node that provides a wireless backhaul service, and the wireless backhaul service is a data and/or signaling backhaul service provided through a wireless backhaul link. In one aspect, the wireless backhaul node may provide a wireless access service for the terminal through an access link (AL). In another aspect, the wireless backhaul node may be connected to the access network device through a one-hop or multi-hop backhaul link (BL). Therefore, the wireless backhaul node may implement data and/or signaling forwarding between the terminal and the access network device, so that coverage of the communication system is expanded.

The wireless backhaul device may have different names in different communication systems. For example, in a long term evolution (LTE) system or an LTE-A system, the wireless backhaul device may be referred to as a relay node (RN). In a fifth generation (the 5th generation, 5G) mobile communication technology system, the wireless backhaul device may be referred to as an integrated access backhaul node (IAB node). Certainly, in other communication systems, the wireless backhaul device may also have different names, and this is not limited herein.

Figure 2:
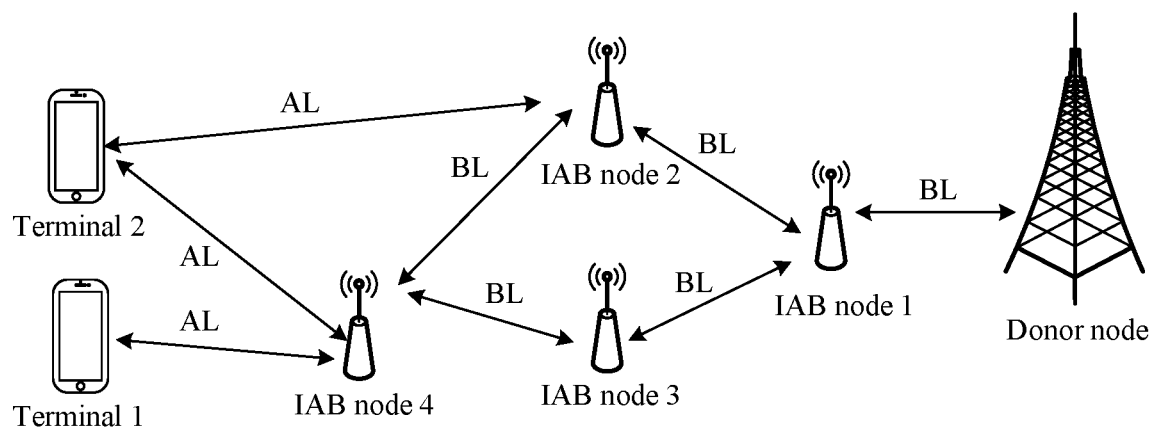
FIG. 2 is an architectural diagram of an IAB network according to an embodiment of this application.

FIG. 2 is an architectural diagram of an IAB network according to an embodiment of this application. The following further describes the terminal, the wireless backhaul device, and the access network device in FIG. 1 with reference to FIG. 2.

In FIG. 2, a terminal 1 or a terminal 2 may correspond to the terminal 110 in FIG. 1. An IAB node 1, an IAB node 2, an IAB node 3, and an IAB node 4 correspond to the wireless backhaul device 130 shown in FIG. 1. A donor node may correspond to the access network device 140 in FIG. 1. The donor node may be connected to the core network device 150 in FIG. 1 in a wired manner. The donor node may be referred to as an IAB donor or a DgNB (namely, a donor gNodeB) for short.

As shown in FIG. 2, in the IAB network 200, the terminal may be connected to one or more IAB nodes in a wireless manner, the one or more IAB nodes may be connected to each other in a wireless manner, and the one or more IAB nodes may be connected to the donor node in a wireless manner. A link between the terminal and the IAB node may be referred to as an access link, and a link between the IAB nodes and a link between the IAB node and the donor node may be referred to as a backhaul link.

To ensure service transmission reliability, the IAB network supports multi-hop IAB node networking and multi-connectivity IAB node networking. Therefore, there may be a plurality of transmission paths between the terminal and the donor node. On one path, there is a determined hierarchical relationship between the IAB nodes, and between the IAB node and a donor node serving the IAB node. Each IAB node considers, as a parent node, a node providing a backhaul service for the IAB node. Correspondingly, each IAB node may be considered as a child node of the parent node of the IAB node.

For example, refer to FIG. 2. A parent node of the IAB node 1 is a donor node, the IAB node 1 is a parent node of the IAB node 2 and the IAB node 3, and both the IAB node 2 and the IAB node 3 are parent nodes of the IAB node 4. An uplink data packet of the terminal may be transmitted to the donor node through one or more IAB nodes, and then is sent by the donor node to a mobile gateway device (for example, a user plane function (UPF) network element in a 5G network). After the donor node receives a downlink data packet from the mobile gateway device, the donor node sends the downlink data packet to the terminal through the one or more IAB nodes. There are two available paths for data packet transmission between the terminal 1 and the donor node: the terminal 1→the IAB node 4→the IAB node 3→the IAB node 1→the donor node, and the terminal 1→the IAB node 4→the IAB node 2→the IAB node 1→the donor node. There are three available paths for data packet transmission between the terminal 2 and the donor node: the terminal 2→the IAB node 4→the IAB node 3→the IAB node 1→the donor node, the terminal 2→the IAB node 4→the IAB node 2→the IAB node 1→the donor node, and the terminal 2→the IAB node 2→the IAB node 1→the donor node.

It may be understood that, in the IAB network, one transmission path between the terminal and the donor node may include one or more IAB nodes. Each IAB node needs to maintain a wireless backhaul link to a parent node, and further needs to maintain a wireless link to a child node. If one IAB node is a node accessed by the terminal, a radio access link exists between the IAB node and a child node (namely, the terminal). If one IAB node is a node that provides a backhaul service for another IAB node, a wireless backhaul link exists between the IAB node and a child node (namely, the another IAB node). For example, refer to FIG. 2. In the path "the terminal 1→the IAB node 4→the IAB node 3→the IAB node 1→the donor node", the terminal 1 accesses the IAB node 4 through a wireless access link, the IAB node 4 accesses the IAB node 3 through a wireless backhaul link, the IAB node 3 accesses the IAB node 1 through a wireless backhaul link, and the IAB node 1 accesses the donor node through a wireless backhaul link.

The foregoing IAB network is merely an example. In an IAB network with multi-hop and multi-connectivity combined, there are more other possibilities in the IAB network. For example, a donor node and an IAB node connected to another donor node form dual connectivity to serve a terminal. The possibilities are not listed one by one herein.

Figure 3A:
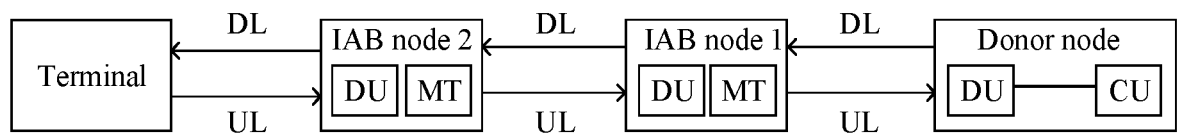
FIG. 3A is an architectural diagram of an IAB network according to an embodiment of this application.

FIG. 3A is an architectural diagram of an IAB network according to an embodiment of this application. The following further describes the IAB node and the donor node in FIG. 2 with reference to FIG. 3A.

In the IAB network, the donor node may be in a form in which a centralized unit (CU for short) (which may be referred to as a donor CU) and a distributed unit (DU) (which may be referred to as a donor DU) are separated.

The donor-CU may be in a form in which a user plane (UP) (which is referred to as a CU-UP for short in this specification) and a control plane (CP) (which is referred to as a CU-CP in this specification) are separated, that is, the donor-CU includes the CU-CP and the CU-UP.

In the IAB network, when the IAB node serves as a parent node, the IAB node may act as a role similar to an access network device, and allocate, to a child node of the IAB node by scheduling on an available air interface resource managed by a donor base station, an uplink resource used for uplink data transmission. When the IAB node serves as a child node, for a parent node serving the IAB node, the IAB node may serve as a terminal device, access a wireless network like the terminal device, and perform a function of the terminal device. The IAB node establishes a connection to the parent node by performing operations such as cell selection and random access, to obtain an uplink resource that is scheduled by the parent node for the IAB node and that is used for uplink data transmission. By way of example and not limitation, in this embodiment of this application, a part of the IAB node that performs a function of a terminal device is referred to as a mobile terminal (MT) side of the IAB node or an MT function unit of the IAB node, and a part of the IAB node that performs a function of an access network device similar to a base station is referred to as a DU side of the IAB node or a DU function unit of the IAB node. The MT function unit and the DU function unit may be merely logical division and are integrated into the IAB node. Alternatively, the MT function unit and the DU function unit may be different physical devices.

As shown in FIG. 3A, the donor node includes the donor-CU and the donor-DU. An IAB node 1 includes an MT side of the IAB node 1 and a DU side of the IAB node 1. An IAB node 2 includes an MT side of the IAB node 2 and a DU side of the IAB node 2.

As shown in FIG. 3A, in a downlink (DL) direction, the donor-DU sends a data packet to the IAB node 1, then the IAB node 1 sends the data packet to the IAB node 2, and finally the IAB node 2 sends the data packet to the terminal.

In an uplink (UL) direction, the terminal may send a data packet to the IAB node 2, the IAB node 2 sends the data packet to the IAB node 1, and the IAB node 1 sends the data packet to the donor-DU.

Figure 3B:
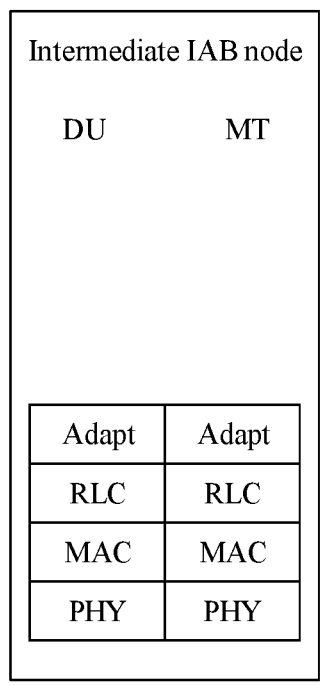
FIG. 3B(a) and FIG. 3B(b) are a diagram of a protocol stack architecture in an IAB network according to an embodiment of this application.
Figure 3B:
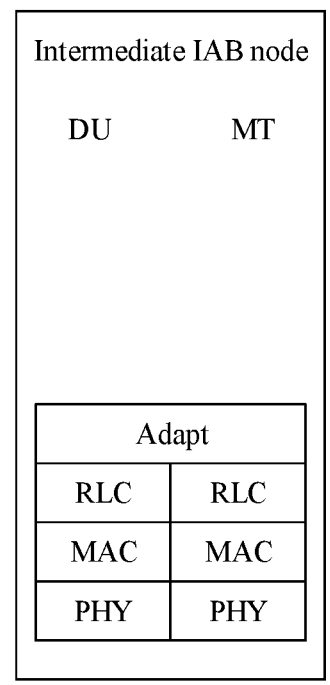

FIG. 3B(a) and FIG. 3B(b) are a diagram of a protocol stack architecture in an IAB network according to an embodiment of this application. Refer to FIG. 3B(a) and FIG. 3B(b).

Protocol stacks of an intermediate IAB node on a user plane and a control plane are the same. FIG. 3B(a) and FIG. 3B(b) are examples of a protocol stack architecture of the intermediate IAB. As shown in FIG. 3B(a), an MT part and a DU part of the intermediate IAB node may not share an adapt layer. As shown in FIG. 3B(b), the MT part and the DU part of the intermediate IAB node may alternatively share an adapt layer.

A protocol stack of an access IAB node on the user plane is different from a protocol stack of the intermediate IAB node on the control plane. For details, refer to an IAB node 1 shown in FIG. 3C and FIG. 3D.

Figure 3C:
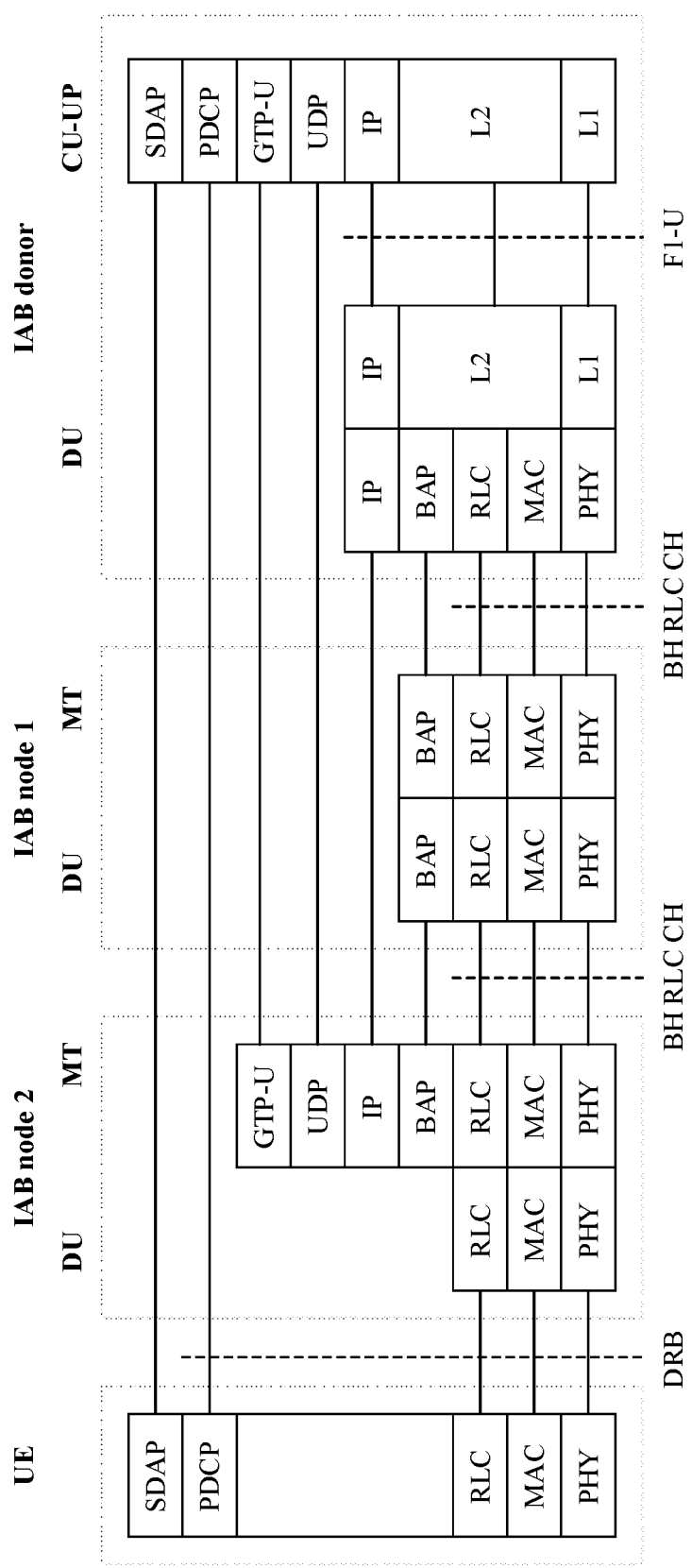
FIG. 3C shows an example of a user plane protocol stack architecture of a multi-hop IAB network according to an embodiment of this application.

FIG. 3C shows an example of a user plane protocol stack architecture of a multi-hop IAB network. As shown in FIG. 3C, meanings of protocol layers in the protocol architecture shown in FIG. 3C are a packet data convergence protocol (PDCP) layer, a general packet radio service tunneling protocol user data tunneling (GTP-U) layer, a user datagram protocol (UDP) layer, an Internet protocol (IP) layer, an L2 (layer 2) layer, an L1 (layer 1) layer, a radio link control (RLC) layer, a media access control (MAC) layer, a physical (PHY) layer, a radio resource control (RRC) layer, an F1 application protocol (F1AP) layer, and a stream control transmission protocol (SCTP) layer. The L2 layer is a link layer. For example, the L2 layer may be a data link layer in an open systems interconnection (OSI) reference model. The L1 layer may be a physical layer. For example, the L1 layer may be a physical layer in the OSI reference model.

To satisfy service quality requirements of different types of services of a terminal device, one or more radio bearers (RBs) are introduced to a wireless network. The radio bearer includes a data radio bearer (DRB) and a signaling radio bearer (SRB), and is used to transmit different types of service data (including control plane signaling and user plane data) between UE and a base station. In the IAB network, an RB may be considered as a logical channel for data transmission between the UE and a donor node.

A protocol layer entity corresponding to each protocol layer is configured for each protocol layer, for example, a PDCP entity, an RLC entity, and a MAC entity. In uplink transmission, after corresponding processing is performed on a data packet (for example, an IP data packet) of the UE at a PDCP layer, the data packet is sent to a PHY layer of an access backhaul node by successively passing through an RLC layer, a MAC layer, and a PHY layer.

As described above, in the IAB network, the IAB node may include a DU part and an MT part. When the IAB node is used as a wireless backhaul node, the MT part of the IAB node performs data forwarding on a backhaul link without requiring a complete protocol stack of the terminal device on a wireless access link. For example, the IAB node 2 shown in FIG. 3A is a child node of the IAB node 1. When the IAB node 2 sends a data packet from the UE to the IAB node 1, the MT of the IAB node 2 does not need the PDCP layer, and the data packet is forwarded under the adapt layer. Therefore, in FIG. 3C, when the IAB node is used as the wireless backhaul node and sends a data packet to a parent node of the IAB node, only a protocol layer below the adapt layer is involved. This is applicable to all IAB nodes, and details are not described again.

When an IAB node serves as a wireless terminal, a protocol stack of a communication link between the IAB node and a parent node is the same as a protocol stack of a radio access link between the UE and an IAB node accessed by the UE, and a protocol stack between the IAB node and a donor CU is the same as a protocol stack between the UE and the donor CU.

In addition, FIG. 3C further shows a user plane protocol stack of an F1 interface between a donor CU and an access IAB node (for example, the IAB node 2 in FIG. 3A). A GTP-U tunnel established on the F1 interface by using a GTP-U protocol layer is in one-to-one correspondence with a data radio bearer DRB of the UE. In other words, each radio bearer of the UE has a GTP tunnel in one-to-one correspondence with the radio bearer.

Figure 3D:
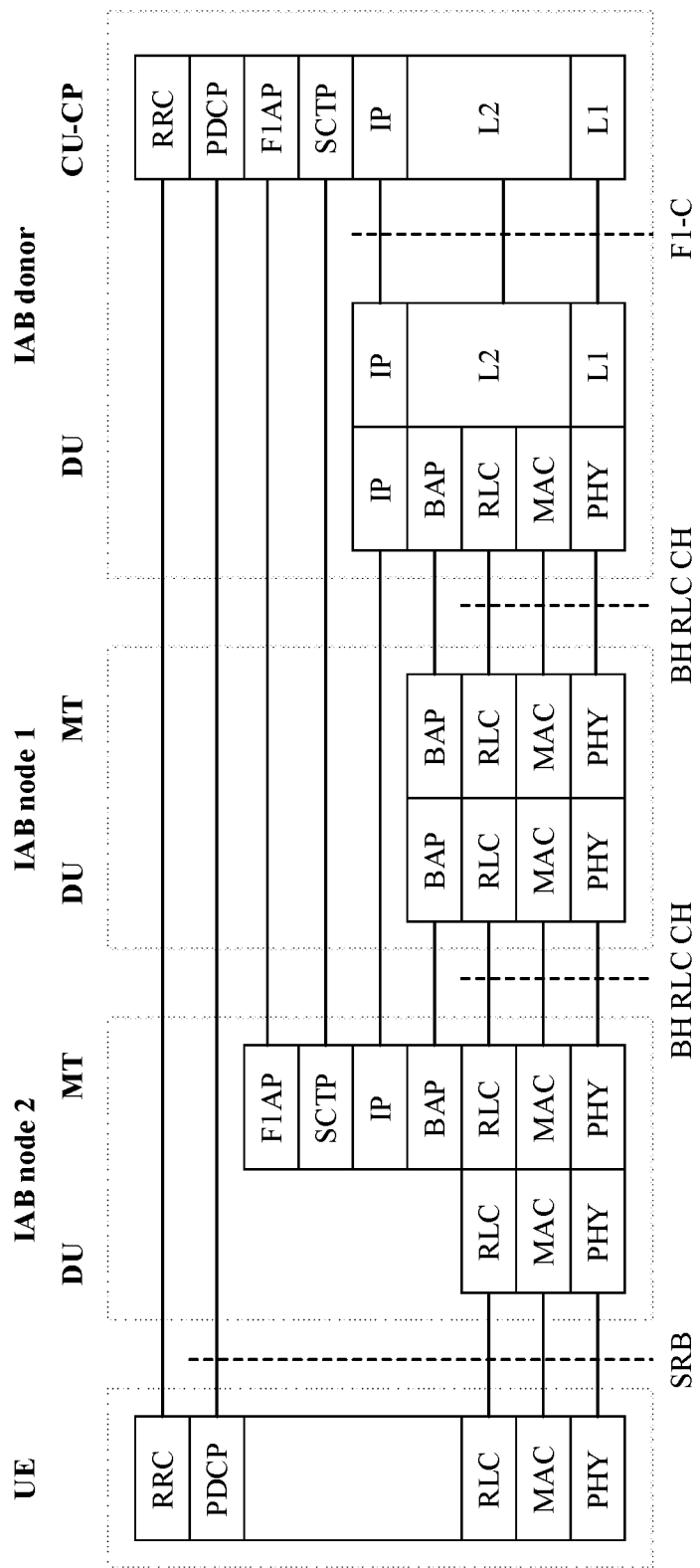
FIG. 3D shows an example of a control plane protocol stack architecture of a multi-hop IAB network according to an embodiment of this application.

FIG. 3D shows an example of a control plane protocol stack architecture of a multi-hop IAB network. The descriptions of each protocol layer in FIG. 3C is also applicable to FIG. 3D, but there are some differences. For example, an F1 control plane (F1-C) protocol stack is used for an F1 interface between an access IAB node and a donor CU in FIG. 3D.

It should be noted that FIG. 3C and FIG. 3D respectively show an example of an end-to-end user plane protocol stack architecture and an example of an end-to-end control plane protocol stack architecture for transmitting a data service of the UE in the IAB network. Optionally, there may be another possibility for the protocol stack architecture. For example, when a protocol stack used for security protection is introduced to the F1 interface between the IAB node 2 and the donor CU, the protocol stack architecture changes.

In addition, if the donor node is an entity with a complete function, the IAB donor reserves protocol stacks of the donor-DU and the donor-CU to an external node interface, and a protocol stack on an internal interface between the donor-DU and the donor-CU is not necessary. Similarly, protocol stacks of the DU part and the MT part of the IAB node may not be distinguished externally, and only a protocol stack to an external node interface is uniformly displayed.

In addition, regardless of the control plane protocol stack architecture or the user plane protocol stack architecture, when the donor-DU is an agent node for the F1 interface between the donor-CU and the IAB node, the user plane protocol stack architecture oriented to the access IAB node in the donor-DU may include, above the IP layer, a UDP layer and a GTP-U layer that are respectively equivalent to a UDP layer and a GTP-U layer in the protocol stack architecture of the DU part in the access IAB node, and may further include an IPsec layer equivalent to the DU part of the access IAB node. The control plane protocol stack architecture oriented to the access IAB node in the donor-DU may include, above the IP layer, an SCTP layer and an F1AP layer that are respectively equivalent to an SCTP layer and an F1AP layer in the protocol stack architecture of the DU part of the access IAB node, and may further include an IPsec layer or a DTLS layer equivalent to the DU part of the access IAB node.

In addition, FIG. 3C and FIG. 3D further relate to an F1 interface.

The F1 interface is a logical interface between a DU part of an IAB node and a donor node (or a donor-CU or a donor-DU). The F1 interface may also be referred to as an F1* interface, and supports a user plane and a control plane. A protocol layer of the F1 interface is a communication protocol layer on the F1 interface.

For example, a user plane protocol layer of the F1 interface may include one or more of an IP layer, a UDP layer, and a GTP-U layer. Optionally, the user plane protocol layer of the F1 interface further includes a PDCP layer and/or an IP security (IPsec) layer.

For example, a control plane protocol layer of the F1 interface may include one or more of an IP layer, an F1AP layer, and an SCTP layer. Optionally, the control plane protocol layer of the F1 interface further includes one or more of a PDCP layer, an IPsec layer, and a datagram transport layer security (DTLS) layer.

To make embodiments of this application clearer, the following collectively describes some content and concepts related to embodiments of this application.

(1) Access IAB Node and Intermediate IAB Node

In embodiments of this application, the access IAB node is an IAB node accessed by a terminal, and the intermediate IAB node is an IAB node that provides a wireless backhaul service for another IAB node (for example, an access IAB node or another intermediate IAB node).

For example, refer to FIG. 2. In the path "the terminal 1→the IAB node 4→the IAB node 3→the IAB node 1→the donor node", the IAB node 4 is an access IAB node, and the IAB node 3 and the IAB node 1 are intermediate IAB nodes. The IAB node 3 provides a backhaul service for the IAB node 4, and the IAB node 1 provides a backhaul service for the IAB node 3.

It should be noted that, an IAB node is an access IAB node for a terminal that accesses the IAB node. For a terminal that accesses another IAB node, the IAB node is an intermediate IAB node. Therefore, whether an IAB node is specifically an access IAB node or an intermediate IAB node is not fixed, and needs to be determined based on a specific application scenario.

(2) Link, Access Link, and Backhaul Link

The link is a path between two neighboring nodes on a path.

The access link is a link accessed by a terminal, and may be a link between the terminal and an access network device, between the terminal and an IAB node, between the terminal and a donor node, or between the terminal and a donor DU. Alternatively, the access link includes a wireless link used when an IAB node serves as a common terminal device to communicate with a parent node of the IAB node. When serving as a common terminal device, the IAB node does not provide a backhaul service for any child node. The access link includes an uplink access link and a downlink access link. In this application, an access link of a terminal is a wireless link. Therefore, the access link may also be referred to as a wireless access link.

The backhaul link is a link between an IAB node and a parent node when the IAB node serves as a wireless backhaul node. When serving as a wireless backhaul node, the IAB node provides a wireless backhaul service for a child node. The backhaul link includes an uplink backhaul link and a downlink backhaul link. In this application, the backhaul link between the IAB node and the parent node is a wireless link. Therefore, the backhaul link may also be referred to as a wireless backhaul link.

(3) Previous-Hop Node of a Node, Next-Hop Node of the Node, Ingress Link of the Node, and Egress Link of the Node The previous-hop node of the node is the last node that is on a path including the node and that receives a data packet before the node.

The next-hop node of the node is the $1^{st}$ node that is on a path including the node and that receives a data packet after the node.

The ingress link of the node is a link between the node and a previous-hop node of the node, and may also be referred to as a previous-hop link of the node.

The egress link of the node is a link between the node and a next-hop node of the node, and may also be referred to as a next-hop link of the node.

(4) Parent node and child node: Each IAB node considers a node that provides a wireless access service and/or a wireless backhaul service for the IAB node as a parent node. Correspondingly, each IAB node may be considered as a child node of the parent node of the IAB node. Alternatively, the child node may also be referred to as a lower-level node, and the parent node may also be referred to as an upper-level node.

(5) Data Packet

The data packet may be a data packet in a radio bearer (RB). The RB may be a data radio bearer (DRB). It may be understood that the data packet is a user plane data packet. Alternatively, the RB may be a signaling radio bearer (SRB). It may be understood that the data packet is a control plane data packet. Alternatively, the data packet may be an operation, administration and maintenance (OAM) data packet. It may be understood that the data packet is a management plane data packet.

(6) Transmission (or transmit) may be understood as sending (send) and/or receiving (receive).

(7) Time domain resource: Consecutive or inconsecutive resources in a time dimension are referred to as time domain resources.

The time domain resource may be an uplink time domain resource, a downlink time domain resource, or a flexible time domain resource. The uplink time domain resource is a time domain resource used for uplink transmission, the downlink time domain resource is a time domain resource used for downlink transmission, and the flexible time domain resource is neither a time domain resource used for uplink transmission nor a time domain resource used for downlink transmission. For example, the uplink time domain resource may include m uplink slots and/or n uplink symbols, where both m and n are integers greater than or equal to 0.

(8) Slot and Symbol:

A length of a slot may be fixed. For example, a slot in LTE is 0.5 millisecond (ms). Alternatively, a length of a slot may be variable. For example, a length of a slot may be different due to different subcarrier spacings in NR.

Based on different subcarrier spacings, 1 ms may include different quantities of slots (slots). For example, when a subcarrier spacing is 15 kHz, 1 ms includes one slot, and the slot occupies 1 ms. When a subcarrier spacing is 30 kHz, 1 ms includes two slots, and each slot occupies 0.5 ms.

A slot may include a plurality of symbols, for example, 12 or 14 symbols. When a symbol is used for uplink transmission, the symbol is referred to as an uplink symbol. When a symbol is used for downlink transmission, the symbol is referred to as a downlink symbol. When a symbol is configured for neither uplink transmission nor downlink transmission, the symbol is referred to as an unknown symbol or a flexible symbol.

(9) Time domain resource length: The time domain resource length is duration occupied by a time domain resource, and a unit of the time domain resource length may be a second, a millisecond, a slot, or a symbol.

(10) Time domain resource format: Time domain resources may be configured in one or more fixed formats. Each format defines a relative position of an uplink time domain resource, a flexible time domain resource, and a downlink time domain resource. For example, the time domain resource format may be downlink-flexible-uplink, indicating that time domain resources in a periodicity may be configured in a format of first a downlink time domain resource, then a flexible time domain resource, and finally an uplink time domain resource. The format may be referred to as a pattern.

(11) Full duplex and half duplex: The full duplex means that transmission in two directions simultaneously exists on one link, and one node simultaneously performs sending and receiving.

The half duplex means that only transmission in one direction exists on one link, and one node performs only sending or receiving.

When working in the full duplex manner, a node simultaneously sends and receives data, and interference may be generated at the node. As a result, some nodes cannot support the full duplex, and can support only the half duplex.

(12) Space division multiplexing: Different links use a same time-frequency resource, but use different space resources for transmission. For example, a link between an IAB node and a parent node and a link between the IAB node and a child node use a same time-frequency resource, but use different space resources for transmission. (13) In embodiments of this application, "a plurality of" means two or more. In view of this, in embodiments of this application, "a plurality of" may also be understood as "at least two". "At least one" may be understood as one or more, for example, one, two, or more. For example, including at least one means including one, two, or more", and there is no limitation on which is included. For example, including at least one of A, B, and C may mean including A, B, C, A and B, A and C, B and C, or A, B, and C. The term "and/or" describes an association relationship for describing associated objects and represents that three relationships may exist. For example, A and/or B may represent the following three cases: Only A exists, both A and B exist, and only B exists. In addition, unless otherwise specified, the character "/" generally indicates an "or" relationship between the associated objects. The terms "system" and "network" may be used interchangeably in embodiments of this application. Unless otherwise specified, ordinal numbers such as "first" and "second" in embodiments of this application are used to distinguish between a plurality of objects, and are not intended to limit a sequence, a time sequence, priorities, or importance of the plurality of objects.

In a conventional air interface transmission mode between a base station and a terminal, because both the base station and the terminal have only one air interface link, time domain resources may be allocated in a fixed format. For example, in a periodicity (for example, n milliseconds or one slot, where n is a positive number), the time domain resources are allocated in a format of a downlink time domain resource—a flexible time domain resource—an uplink time domain resource. However, in the communication systems in FIG. 1 to FIG. 3A, each node in the IAB network has a plurality of backhaul links. For example, each IAB node may include a link between the IAB node and a parent node and a link between the IAB node and a child node. If allocation is performed for each IAB node in only the format of a downlink time domain resource-a flexible time domain resource-an uplink time domain resource in a periodicity (for example, n milliseconds or one slot, where n is a positive number), at a moment, when a downlink time domain resource between the IAB node and the parent node is configured for the IAB node, a downlink time domain resource between the IAB node and the child node may also be configured. In other words, the IAB node simultaneously performs downlink transmission with the parent node and the child node, but cannot perform uplink transmission. Conversely, there is a similar case in uplink. Consequently, the plurality of backhaul links in the entire IAB network are used for only downlink transmission or only uplink transmission at a moment. This greatly increases a delay of transmitting uplink data or downlink data, and affects user experience of a terminal.

In addition, in a current IAB network, an IAB node cannot support full duplex, and is limited to half duplex. For example, the IAB node cannot perform downlink transmission with a child node (which may be understood as sending downlink data to the child node) while performing downlink transmission with a parent node (which may be understood as receiving downlink data from the parent node). Therefore, the IAB node can perform downlink transmission with the child node only after downlink transmission with the parent node is completed. This greatly reduces time domain resource utilization efficiency in the IAB network, reduces a throughput of the IAB network, greatly increases a data transmission delay, and affects user experience of the terminal.

An embodiment of this application provides a solution, in which when an IAB donor allocates time domain resources to an IAB node, in a periodicity (for example, n milliseconds or one slot, where n is a positive number), in addition to performing allocation based on a pattern of a downlink time domain resource, a flexible time domain resource, and an uplink time domain resource, the IAB donor may further perform allocation based on a pattern of an uplink time domain resource, a flexible time domain resource, and a downlink time domain resource. Therefore, for the IAB node, when an uplink time domain resource on a link between the IAB node and a parent node is configured, a downlink time domain resource on a link between the IAB node and a child node may further be configured. In other words, the IAB node may perform downlink transmission with the child node (which may be understood as sending downlink data to the child node) while performing uplink transmission with the parent node (which may be understood as sending uplink data to the parent node). Conversely, there is a similar case in uplink. Therefore, an advantage of wireless backhaul in an IAB network can be brought into full play, SDM can be implemented, time domain resource utilization efficiency can be increased, a throughput of the IAB network can be increased, and user experience of a terminal can be improved.

For example, in the system shown in FIG. 3A, both a downlink time domain resource between the IAB node 1 and the donor node and an uplink time domain resource between the IAB node 1 and the IAB node 2 may be configured. In other words, when receiving a downlink data packet from the donor DU, the IAB node 1 may receive an uplink data packet from the IAB node 2, so that a downlink between the IAB node 1 and the donor node and an uplink between the IAB node 1 and the IAB node 2 may multiplex a same time domain resource. Therefore, SDM is implemented, time domain resource utilization efficiency is increased, and a throughput of an IAB system is increased.

The following describes the solutions provided in embodiments of this application with reference to the accompanying drawings.

Figure 4:
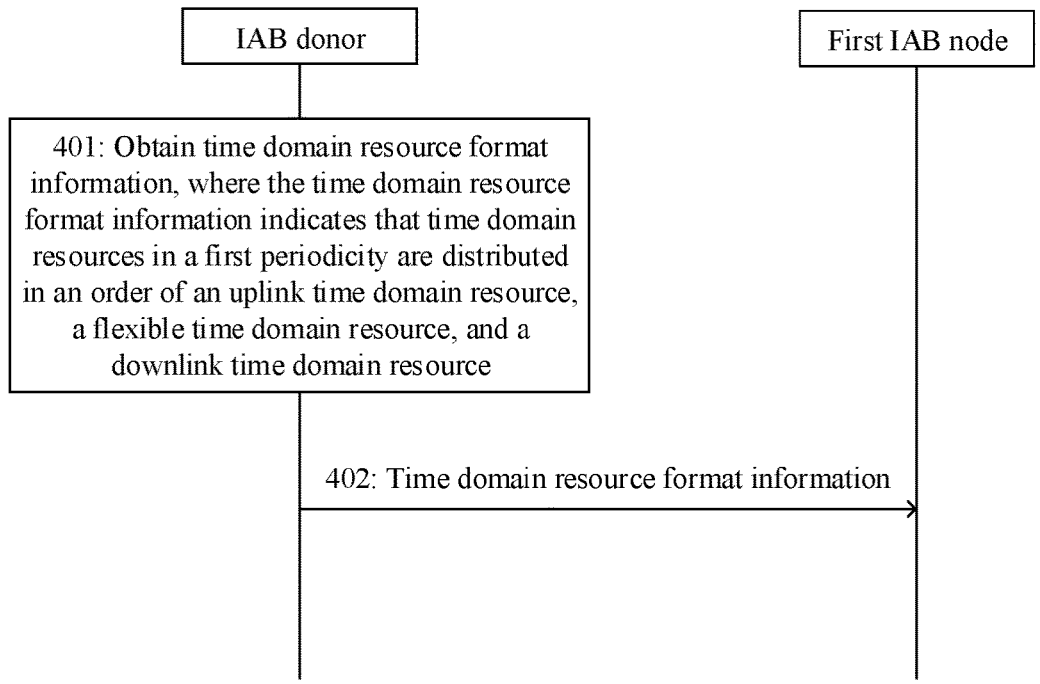
FIG. 4 is a diagram of signaling exchange of a time domain resource format configuration method according to an embodiment of this application.

FIG. 4 is a diagram of signaling exchange of a time domain resource format configuration method according to an embodiment of this application. An IAB donor in FIG. 4 may be the donor node in FIG. 3A, a first IAB node in FIG. 4 may be the IAB node 2 in FIG. 3A, and a parent node of the first IAB node is the IAB node 1 in FIG. 3A. As shown in FIG. 4, the method includes the following steps.

S401: The IAB donor obtains time domain resource format information.

The time domain resource format information indicates that time domain resources in a first periodicity are distributed in an order of an uplink time domain resource, a flexible time domain resource, and a downlink time domain resource.

Optionally, the obtaining herein may be understood as generating or receiving from another network device.

S402: The IAB donor sends the time domain resource format information to the first IAB node.

Optionally, that the time domain resource format information indicates that time domain resources in a first periodicity are distributed in an order of an uplink time domain resource, a flexible time domain resource, and a downlink time domain resource may be understood as that the time domain resources in the first periodicity are first an uplink time domain resource, then a flexible time domain resource, and finally a downlink time domain resource. For ease of description in the following, in this specification, a time domain resource format of first an uplink time domain resource, then a flexible time domain resource, and finally a downlink time domain resource is represented as uplink (U)-flexible (F)-downlink (D). Similarly, in this specification, a time domain resource format of first a downlink time domain resource, then a flexible time domain resource, and finally an uplink time domain resource is represented as D-F-U.

Optionally, that the time domain resource format information indicates that time domain resources in a first periodicity are distributed in an order of an uplink time domain resource, a flexible time domain resource, and a downlink time domain resource may be understood as that when there is an uplink time domain resource in the first periodicity, the first periodicity starts with the uplink time domain resource, then a flexible time domain resource, and finally a downlink time domain resource; when there is no uplink time domain resource, the first periodicity starts with a flexible time domain resource, and then a downlink time domain resource; and when there is no flexible time domain resource, the first periodicity starts with a downlink time domain resource.

Although the time domain resource format information indicates that the time domain resource format in the first periodicity is U-F-D, an uplink time domain resource, a flexible time domain resource, and a downlink time domain resource may not all exist in the first periodicity. After receiving the time domain resource format information, the first IAB node may determine the time domain resource format in the first periodicity based on time domain resources actually allocated to the first periodicity. For example, when there is no uplink time domain resource in the first periodicity, the time domain resources in the first periodicity starts with a flexible time domain resource and ends with a downlink time domain resource (which may be represented as F-D for ease of description). For another example, when there is no downlink time domain resource in the first periodicity, the time domain resources in the first periodicity starts with an uplink time domain resource and ends with a flexible time domain resource (which may be represented as U-F for ease of description).

For ease of understanding, it is assumed that an uplink time domain resource in the first periodicity includes A symbols, a flexible time domain resource includes B symbols, and a downlink time domain resource includes C symbols. A, B, and C are all integers greater than or equal to 0, for example, 0, 1, 2, or a greater integer.

When A is greater than 1, the A symbols are consecutive.
When B is greater than 1, the B symbols are consecutive.
When C is greater than 1, the C symbols are consecutive.

Optionally, A, B, or C may be greater than or equal to a quantity of symbols included in one or more slots.

Optionally, the A symbols may include all symbols in $n_1$ consecutive slots+$x_1$ symbols in a slot immediately preceding the $n_1$ consecutive slots and/or $y_1$ symbols in a slot immediately following the $n_1$ consecutive slots, where $n_1$, $x_1$, and $y_1$ are all positive integers greater than or equal to 0. Similarly, the B symbols may include all symbols in $n_2$ consecutive slots+$x_2$ symbols in a slot immediately preceding the $n_2$ consecutive slots and/or $y_2$ symbols in a slot immediately following the $n_2$ consecutive slots, where $n_2$, $x_2$, and $y_2$ are all positive integers greater than or equal to 0. Similarly, the C symbols may include all symbols in $n_3$ consecutive slots+$x_3$ symbols in a slot immediately preceding the $n_3$ consecutive slots and/or $y_3$ symbols in a slot immediately following the $n_3$ consecutive slots, where $n_3$, $x_3$, and $y_3$ are all positive integers greater than or equal to 0.

Optionally, based on values of A, B, and C, there are the following cases for the time domain resource format indicated by the time domain resource format information.

Figure 5A:
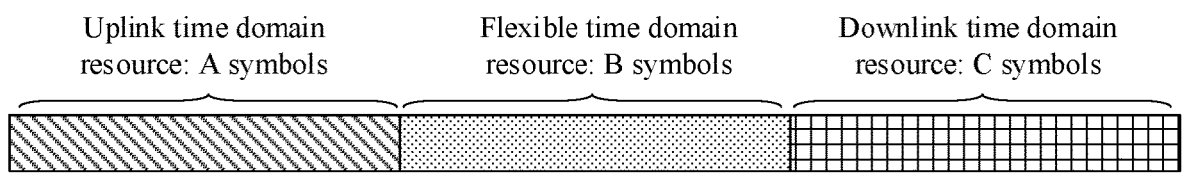
FIG. 5A is a schematic diagram of a time domain resource according to an embodiment of this application.

(1) None of A, B, and C is 0. FIG. 5A is a schematic diagram of a time domain resource. Refer to FIG. 5A. In the first periodicity, the first A symbols are uplink time domain resources, B symbols in the middle are flexible time domain resources, and the last C symbols are downlink time domain resources.

(2) A is 0, and B and C are not 0. In the time domain resources in the first periodicity, the first B symbols are flexible time domain resources, and the following C symbols are downlink time domain resources.

(3) B is 0, and A and C are not 0. In the time domain resources in the first periodicity, the first A symbols are uplink time domain resources, and the following C symbols are downlink time domain resources.

(4) C is 0, and A and B are not 0. In the time domain resources in the first periodicity, the first A symbols are uplink time domain resources, and the following B symbols are flexible time domain resources.

(5) A and B are 0, and C is not 0. The time domain resources in the first periodicity include C symbols, and the C symbols are downlink time domain resources.

(6) A and C are 0, and B is not 0. The time domain resources in the first periodicity include B symbols, and the B symbols are flexible time domain resources.

(7) B and C are 0, and A is not 0. The time domain resources in the first periodicity include A symbols, and the A symbols are downlink time domain resources.

The first periodicity indicated by the time domain resource format information may be understood as a time length, for example, may be 5 ms, or a slot.

Optionally, the IAB donor may further configure, for the IAB node, respective lengths of the uplink time domain resource, the flexible time domain resource, and the downlink time domain resource.

Optionally, the first periodicity indicated by the time domain resource format information may be the same as a periodicity used when the IAB donor configures, for the IAB node, the respective lengths of the uplink time domain resource, the flexible time domain resource, and the downlink time domain resource.

Optionally, information (for example, time domain resource length information) other than the time domain resource format information may be used to indicate the respective lengths of the uplink time domain resource, the flexible time domain resource, and the downlink time domain resource in the first periodicity, for example, quantities of symbols (or slots or other time units) included in the respective lengths of the uplink time domain resource, the flexible time domain resource, and the downlink time domain resource. Alternatively, the time domain resource format information may indicate the respective lengths of the uplink time domain resource, the flexible time domain resource, and the downlink time domain resource in the first periodicity. This may also be understood as that the time domain resource format information includes the time domain resource length information. The following first describes the time domain resource length information. Descriptions are provided below on the premise that the time domain resource format information does not include the time domain resource length information, and the time domain resource format information and the time domain resource length information are two pieces of parallel information. It should be noted that the time domain resource format may include the time domain resource length information, and the following content is also applicable to a case in which the time domain resource format includes the time domain resource length information.

Optionally, the time domain resource length information may include two or more of a length of a periodicity (for example, n milliseconds or one slot, where n is a positive number), a quantity of downlink symbols (which may be a quantity of downlink slots+a quantity of downlink symbols when the periodicity is greater than one slot), a quantity of flexible symbols (which may be a quantity of flexible slots+a quantity of flexible symbols when the periodicity is greater than one slot), and a quantity of uplink symbols (which may be a quantity of uplink slots+a quantity of uplink symbols when the periodicity is greater than one slot).

Optionally, the time domain resource length information may be time domain resource length information at a cell granularity. The time domain resource length information at the cell granularity may be understood as that the time domain resource length information takes effect for both an IAB node and/or a terminal in a cell (where taking effect may be understood as that the information is valid for both the IAB node and/or the terminal, and the IAB node and/or the terminal can read and use the information). The time domain resource length information may be carried in a system message, for example, a system information block (SIB) 1, and both the IAB node and/or the terminal in the cell may receive the time domain resource length information.

Optionally, the time domain resource length information at the cell granularity may include a periodicity, a quantity of downlink slots, a quantity of downlink symbols, a quantity of uplink slots, and a quantity of uplink symbols. It may be understood that a quantity of flexible slots and a quantity of flexible symbols may be obtained by subtracting, from the periodicity, the quantity of downlink slots, the quantity of downlink symbols, the quantity of uplink slots, and the quantity of uplink symbols.

For example, in the time domain resource length information at the cell granularity, the periodicity is 2.5 ms, the quantity of downlink slots is 2, the quantity of downlink symbols is 3, the quantity of uplink slots is 2, and the quantity of uplink symbols is 4. It is assumed that one slot is 0.5 ms (a subcarrier spacing is 30 kHz). Therefore, after receiving the time domain resource length information at the cell granularity, the IAB node may determine that the periodicity of 2.5 ms includes five slots in total, and the quantity of flexible symbols is 7 (there are five slots in total, including two downlink slots and two uplink slots; and there are four uplink symbols and three downlink symbols in the remaining slot, so that there are 14−3−4=7 flexible symbols).

Optionally, after receiving the time domain resource length information at the cell granularity, the IAB node may repeat a configuration that is of the time domain resource length and that is in a periodicity. For example, if the periodicity is 2.5 ms, a time domain resource length of the IAB node in 2.5 ms to 5 ms and a time domain resource length of the IAB node in 0 ms to 2.5 ms are the same, and are both configured based on the time domain resource length information at the cell granularity.

Optionally, the time domain resource format information may indicate the time domain resource format in the periodicity indicated by the time domain resource length information at the cell granularity. For example, the time domain resource format information may indicate that a time domain resource format in a periodicity of 2.5 ms is U-F-D. In this case, with reference to the time domain resource length information at the cell granularity and the time domain resource format information, in the periodicity of 2.5 ms, the first two slots (a slot 0 and a slot 1)+the following four symbols are uplink time domain resources, seven symbols in the middle are flexible time domain resources, and the last three symbols+two slots (a slot 3 and a slot 4) are downlink time domain resources.

Optionally, the time domain resource length information may be time domain resource length information at an IAB node granularity. The time domain resource length information at the IAB node granularity may be understood as that the time domain resource length information is valid for only an IAB node. The time domain resource length information may be carried in an RRC message, and the RRC message is sent by the IAB donor to the IAB node.

Optionally, the first periodicity may be a slot, and the time domain resource length information may include an index of the slot, a quantity of downlink symbols, and a quantity of uplink symbols. For example, the quantity of downlink symbols is x, and the quantity of uplink symbols is y, where x and y are integers greater than or equal to 0. A quantity of flexible symbols is obtained by subtracting the quantity of downlink symbols and the quantity of uplink symbols from a quantity of symbols included in the slot.

Optionally, when configuring the time domain resources for the IAB node, the IAB donor may first deliver the time domain resource length information at the cell granularity, and then deliver the time domain resource length information at the IAB node granularity. The time domain resource length information at the IAB node granularity is used to reconfigure (which is also referred to as replacing) a flexible time domain resource indicated by the time domain resource length information at the cell granularity. For example, one or more flexible symbols indicated by the time domain resource length information at the cell granularity are configured as an uplink symbol or a downlink symbol. Alternatively, the IAB donor may deliver only the time domain resource length information at the cell granularity, and does not deliver the time domain resource length information at the IAB node granularity. Alternatively, the IAB donor may deliver only the time domain resource length information at the IAB node granularity, and does not first deliver the time domain resource length information at the cell granularity.

For example, based on the time domain resource length information at the cell granularity and the time domain resource format information, the time domain resource length information at the IAB node granularity may further be used to reconfigure a flexible time domain resource. For example, based on the time domain resource length information at the cell granularity and the time domain resource format information, the first four symbols in a slot 2 are uplink symbols, seven symbols in the middle are flexible symbols, and the last three symbols are downlink symbols. The time domain resource length information at the IAB node granularity may include an index of the slot being 2, a quantity of downlink symbols being 5, and a quantity of uplink symbols being 6. In other words, the time domain resource length information at the IAB node granularity changes a configuration of the slot 2 in the time domain resource length information at the cell granularity, and the changed slot 2 includes six uplink symbols, three flexible symbols, and five downlink symbols.

Optionally, the time domain resource format information may indicate the time domain resource format in the periodicity indicated by the time domain resource length information at the IAB node granularity. For example, the time domain resource format information may indicate that a time domain resource format of the slot 2 is U-F-D. In this case, in the slot 2, the first six symbols are uplink symbols, three symbols in the middle are flexible symbols, and the last five symbols are downlink symbols.

The following describes the time domain resource format information with reference to a first implementation to a fifth implementation.

First Implementation:

The time domain resource format information includes a bitmap. The bitmap includes at least one bit, the at least one bit is in one-to-one correspondence with at least one periodicity, and each bit indicates a slot format of a periodicity corresponding to the bit. The time domain resource format may be U-F-D or D-F-U. The at least one periodicity includes the first periodicity, the at least one bit includes a first bit, and the first bit indicates that the time domain resource format in the first periodicity is U-F-D. For example, when a bit is 0, it indicates that a time domain resource format of a corresponding periodicity is U-F-D; and when the bit is 1, it indicates that the time domain resource format of the corresponding periodicity is D-F-U.

Figure 5B:
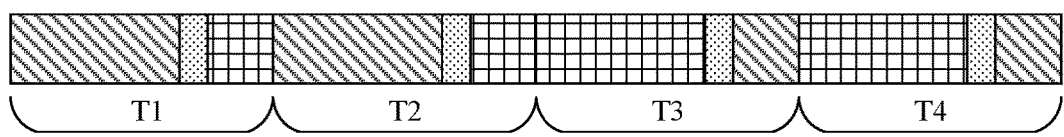
FIG. 5B is another schematic diagram of a time domain resource according to an embodiment of this application.

For example, the bitmap is 1100. FIG. 5B is another schematic diagram of a time domain resource. As shown in FIG. 5B, the $1^{st}$ bit is 1, indicating that a time domain resource format of the 1St periodicity (T1) is D-F-U; the $2^{nd}$ bit is 1, indicating that a time domain resource format of the $2^{nd}$ periodicity (T2) is D-F-U; the $3^{rd}$ bit is 0, indicating that a time domain resource format of the $3^{rd}$ periodicity (T3) is U-F-D; and the $4^{th}$ bit is 0, indicating that a time domain resource format of the $4^{th}$ periodicity (T4) is U-F-D.

Optionally, a time domain resource length in each periodicity may be configured by using the foregoing time domain resource length information, for example, the time domain resource length information at the cell granularity and/or the time domain resource length information at the IAB node granularity.

Optionally, the bitmap may be repeatedly used. For example, the bitmap is 1100. After being used for the $1^{st}$ periodicity to the $4^{th}$ periodicity (namely, T1 to T4), the bitmap is also applicable to the $5^{th}$ periodicity to the $8^{th}$ periodicity (namely, T5 to T8). For example, a time domain resource format of T5 is D-F-U, a time domain resource format of T6 is D-F-U, a time domain resource format of T7 is U-F-D, and a time domain resource format of T8 is U-F-D.

In the first implementation, the one-to-one correspondence between the at least one bit and the at least one periodicity may be configured. For example, the IAB donor may send the one-to-one correspondence between the at least one bit and the at least one periodicity to the first IAB node, or the IAB donor and the first IAB node may preconfigure the one-to-one correspondence between the at least one bit and the at least one periodicity (for example, statically write the one-to-one correspondence in the first IAB node and the IAB donor).

Optionally, the at least one periodicity may be at least one consecutive periodicity, and the bitmap may be at least one consecutive bit.

Optionally, the first IAB node and the IAB donor may configure a periodicity (which is referred to as a start periodicity for ease of description) corresponding to the $1^{st}$ bit in the bitmap, and then bits following the $1^{st}$ bit in the bitmap sequentially correspond to periodicities following the start periodicity.

In an example, the IAB donor may send information to the first IAB node, to indicate the periodicity corresponding to the $1^{st}$ bit in the bitmap. For example, the information may include an index of the $1^{st}$ slot or an index of the $1^{st}$ frame in the periodicity corresponding to the $1^{st}$ bit in the bitmap.

In another example, the first IAB node and the IAB donor may preconfigure the periodicity corresponding to the $1^{st}$ bit in the bitmap, for example, receive an $N^{th}$ periodicity after the bitmap, where N is an integer greater than or equal to 1. For example, the first IAB node receives a bitmap in a periodicity 0, where the $1^{st}$ bit in the bitmap indicates a time domain resource format of a periodicity (which is referred to as a periodicity 1 for short) next to the periodicity 0, and a bit (for example, the $2^{nd}$ bit) following the bit 1 sequentially indicates a periodicity (for example, a periodicity 2) following the periodicity 1.

In another example, the first IAB node and the IAB donor may configure in such a manner that the $1^{st}$ bit in the bitmap corresponds to a periodicity in which the $1^{st}$ symbol at the beginning of each odd frame is located. For example, a length, configured by the IAB donor, of the first periodicity is p. It may be specified that p may be exactly divided by m (for example, m is 20 ms, that is, a length of two frames). In this case, a length of the bitmap may be m/p, and it may be configured in such a manner that the $1^{st}$ bit in the bitmap corresponds to the periodicity in which the $1^{st}$ symbol at the beginning of each odd frame is located. It should be noted that this example is also applicable to a case in which the IAB node and the IAB donor may configure in such a manner that the $1^{st}$ bit in the bitmap corresponds to a periodicity in which the $1^{st}$ symbol at the beginning of each even frame is located.

Optionally, the length of the bitmap may be variable. For example, the length of the bitmap is set based on a quantity of periodicities that actually need to be indicated. Alternatively, the length of the bitmap may be fixed. For example, the length of the bitmap is fixed to 4.

Second Implementation:

The time domain resource format information may indicate that a time domain resource format of each of T1 periodicities is D-F-U, and that a time domain resource format of each of T2 periodicities following the T1 periodicities is U-F-D, and the T2 periodicities include the first periodicity in S401. Both T1 and T2 are positive integers greater than or equal to 1.

Optionally, the T1 periodicities are consecutive, and the T2 periodicities are consecutive.

Optionally, the T2 periodicities immediately follow the T1 periodicities, or there are T3 periodicities between the T2 periodicities and the T1 periodicities. T3 may be preconfigured, or may be included in the time domain resource format information.

Optionally, the time domain resource format information may include one or both of T1 and T2.

For example, the time domain resource format information may include T1, and T2 may be preconfigured or predefined (for example, T2 is statically written in the first IAB node and the IAB donor, or the first IAB node and the IAB donor predefine a rule). In this way, the IAB donor and the first IAB node may determine that the time domain resource format of each of the T1 periodicities is D-F-U and the time domain resource format of each of the T2 periodicities after the T1 periodicities is U-F-D.

For another example, the time domain resource format information may include T2, and T1 may be preconfigured or predefined (for example, T1 is statically written in the first IAB node and the IAB donor, or the first IAB node and the IAB donor predefine a rule). In this way, the IAB donor and the first IAB node may determine that the time domain resource format of each of the T1 periodicities is D-F-U and the time domain resource format of each of the T2 periodicities after the T1 periodicities is U-F-D.

For another example, the time domain resource format information may include both T1 and T2.

For example, T2 is 1.

Optionally, the time domain resource format information may be repeatedly used. To be specific, after the T2 periodicities end, the time domain resource format information is applicable to next T1 periodicities+T2 periodicities. A quantity of times that the time domain resource format information is repeatedly used is not limited in this application.

For example, a time domain resource format of each of T1 periodicities after the T2 periodicities is D-F-U, and a time domain resource format of each of T2 periodicities after the T1 periodicities is U-F-D.

An example in which the time domain resource format information indicates that the time domain resource format of each of the T1 periodicities is D-F-U, and that the time domain resource format of each of the T2 periodicities after the T1 periodicities is U-F-D is used for description above. A person skilled in the art may understand that an example in which the time domain resource format information indicates that the time domain resource format of each of the T1 periodicities is U-F-D, and that the time domain resource format of each of the T2 periodicities after the T1 periodicities is D-F-U is also applicable to the foregoing descriptions. Details are not described herein again.

Optionally, in the first implementation and the second implementation, respective lengths of an uplink time domain resource, a flexible time domain resource, and a downlink time domain resource in one or more periodicities may be indicated by using the time domain resource length information, and a time domain resource format of each of the one or more periodicities is indicated by using the time domain resource format information. Therefore, the time domain resource format of each periodicity may be flexibly determined. For example, whether the time domain resource format of each periodicity is D-F-U or U-F-D may be determined based on an actual uplink and downlink transmission requirement, so that time domain resources in an IAB network can be flexibly allocated, and a capacity of the IAB network can be increased.

Optionally, in another alternative implementation of the first implementation and the second implementation, when the time domain resource length information is used to configure the time domain resource length, each of the one or more periodicities may be configured based on the D-F-U format by default, and then the time domain resource format information may indicate only a part or all of periodicities whose time domain resource formats are changed to U-F-D. For example, the time domain resource format information may include indexes of a part or all of periodicities whose time domain resource formats are changed to U-F-D.

Third Implementation:

Optionally, the time domain resource format information includes the time domain resource length information. In other words, when a length of an uplink time domain resource or a downlink time domain resource in a periodicity is indicated, a time domain resource format of the periodicity is indicated.

For example, an information element "ulfirst" may be added. When a value of "ulfirst" is true, the time domain resource format of the periodicity is U-F-D; and when the value of "ulfirst" is false, the time domain resource format of the periodicity is D-F-U. Alternatively, when the value of "ulfirst" is true, the time domain resource format of the periodicity is U-F-D; and when the information element does not exist, the time domain resource format of the periodicity is D-F-U. In other words, regardless of whether the time domain resource format is configured as U-F-D or D-F-U, the following information element structure may be used for implementation. Alternatively, optionally, in addition to the information element "ulfirst", an information element "dlfirst" may further be added. When the value of "ulfirst" is true, the time domain resource format of the periodicity is U-F-D; and when a value of "dlfirst" is true, the time domain resource format of the periodicity is D-F-U.

For details, refer to a TDD uplink and downlink slot configuration information element ("TDD-UL-DL-SlotConfig") in a TDD uplink and downlink configuration information element ("TDD-UL-DL-Config") in section 6.3.2 in 3GPP TS 38.331 V15.2.1. Specifically, "TDD-UL-DL-SlotConfig" (which may be referred to as a first TDD uplink and downlink slot configuration) is a sequence, and includes:

(1) a slot index ("slotIndex"), where for an information element type, refer to an information element "TDD- UL-DL-SlotIndex" in an information element "TDD-UL-DL-Config" in section 6.3.2 in 3GPP TS 38.331 V15.2.1; and (2) a symbol ("symbols"), where an information element type is choice (indicating that one lower-level information element is selected); the lower-level information element includes all downlink ("allDownlink") that may be null ("NULL"), all uplink ("allUplink") that may be null ("NULL"), and an explicit indication (explicit) that is a sequence; the explicit indication includes a quantity (nrofDownlinkSymbols) of downlink symbols and a quantity (nrofUplinkSymbols) of uplink symbols; the quantity of downlink symbols is an integer from 1 to a maximum quantity ("maxNrofSymbols") of symbols-1, and is optional; and the quantity symbols-1, and is optional.

```
TDD-UL-DL-SlotConfig ::=    SEQUENCE {
   slotindex                TDD-UL-DL-SlotIndex,
   symbols                  CHOICE {
      allDownlink           NULL,
      allUplink             NULL,
      explicit              SEQUENCE {
         nrofDownlinkSymbols   INTEGER  (1..maxNrofSymbols-1)
             OPTIONAL,
         nrofUplinkSymbols INTEGER      (1..maxNrofSymbols-1)
             OPTIONAL
      }
   }
}
```

Specifically, a second TDD uplink and downlink slot configuration information element may be defined, and the information element "ulfirst" is included in the second TDD uplink and downlink slot configuration information element (for example, the following second TDD uplink and downlink slot configuration information element is "TDD-UL-DL-SlotConfig—new", and a specific information element name is not limited in this embodiment). There are the following several examples for a position of the information element "ulfirst".

Example 1

A format of the second TDD uplink and downlink slot configuration information element is as follows: The information element "ulfirst" may be added based on a TDD uplink and downlink slot configuration information element ("TDD-UL-DL-SlotConfig"). A type of the information element "ulfirst" is an enumerated type, and a position of the information element "ulfirst" is shown as follows:

```
TDD-UL-DL-SlotConfig--new ::=    SEQUENCE {
   slotindex                     TDD-UL-DL-SlotIndex,
   ulfirst                       ENUMERATED {true}
   symbols                       CHOICE {
      allDownlink                NULL,
      allUplink                  NULL,
      explicit                   SEQUENCE {
         nrofDownlinkSymbols        INTEGER   (1..maxNrofSymbols-1)
             OPTIONAL,
         nrofUplinkSymbols          INTEGER   (1..maxNrofSymbols-1)
             OPTIONAL
      }
   }
}
```

Example 2

A format of the second TDD uplink and downlink slot configuration information element is as follows: The information element "ulfirst" may be added based on a TDD uplink and downlink slot configuration information element ("TDD-UL-DL-SlotConfig"). A type of the information element "ulfirst" is an enumerated type, and a position of the information element "ulfirst" is shown as follows:

```
TDD-UL-DL-SlotConfig—new ::=    SEQUENCE {
   slotindex                    TDD-UL-DL-SlotIndex,
   symbols                      CHOICE {
      allDownlink               NULL,
      allUplink                 NULL,
      explicit                  SEQUENCE {
         nrofDownlinkSymbols       INTEGER    (1..maxNrofSymbols-1)
             OPTIONAL,
         nrofUplinkSymbols         INTEGER    (1..maxNrofSymbols-1)
             OPTIONAL
      ulfirst                   ENUMERATED {true}
   }
   }
}
```

Example 3

Optionally, the information element in Example 1 or Example 2 may alternatively be transformed. Two information elements, namely, all uplink ("nrofDownlinkSymbols") and all downlink ("nrofUplinkSymbols") may be deleted, a value of the quantity of downlink symbols is changed to be greater than or equal to 0 and less than or equal to the maximum quantity ("maxNrofSymbols") of symbols, a value of the quantity of uplink symbols is changed to be greater than or equal to 0 and less than or equal to the maximum quantity ("maxNrofSymbols") of symbols, and an information element "ulfirst" is added. Details are shown below:

```
TDD-UL-DL-SlotConfig--new ::=    SEQUENCE {
    slotindex                        TDD-UL-DL-SlotIndex,
    ulfirst                          ENUMERATED {true}
    nrofDownlinkSymbols                  INTEGER    (0..maxNrofSymbols)
OPTIONAL,
    nrofUplinkSymbols                    INTEGER    (0..maxNrofSymbols)
OPTIONAL
}
```

Optionally, both the slot format D-F-U and the slot format U-F-D may be represented by using the information element in Example 1 to Example 3. For example, when the value of "ulfirst" is false, the time domain resource format of the periodicity is D-F-U; or when the value of "ulfirst" is true, the time domain resource format of the periodicity is U-F-D. When the information element does not exist, the time domain resource format of the periodicity is D-F-U.

Optionally, the slot format U-F-D may be indicated by using the information element in Example 1 to Example 3. For example, the value of "ulfirst" is true. The slot format D-F-U may be indicated by using the TDD uplink and downlink slot configuration information element ("TDD-UL-DL-SlotConfig") in the TDD uplink and downlink configuration information element ("TDD-UL-DL-Config") in section 6.3.2 in 3GPP TS 38.331 V15.2.1.

In the third implementation, when the quantity of uplink time domain resources, the quantity of flexible time domain resources, and the quantity of downlink time domain resources in the one or more periodicities are indicated, the time domain resource format of the one or more periodicities is specified. For an indication manner at a cell granularity, the time domain resource format needs to be configured only once to take effect in the one or more periodicities, so that signaling is saved. For an indication manner at an IAB node granularity, a format of each indicated slot may be flexibly determined. For example, a slot whose format is U-F-D and a slot whose format is D-F-U may be determined based on an actual requirement in an IAB network. Therefore, time domain resources in the IAB network can be flexibly allocated, and a capacity of the IAB network can be increased.

Fourth Implementation:

Optionally, the time domain resource format information includes the time domain resource length information. In other words, when a length of an uplink time domain resource or a downlink time domain resource in a periodicity is indicated, a time domain resource format of the periodicity is indicated.

In the first implementation to the third implementation, the time domain resource format information indicates the time domain resource format of the periodicity by using one piece of explicit indication information. In the fourth implementation, the time domain resource format information may indicate the time domain resource format implicitly. When the time domain resource length information indicates the length of the uplink time domain resource or the downlink time domain resource, whether a position of the uplink time domain resource is at the beginning or the end may be configured.

For example, two sets of information elements may be defined. Each set of information elements indicates the length of the uplink time domain resource or the downlink time domain resource in the periodicity. A time domain resource format, in one information element, of the periodicity is U-F-D, and a time domain resource format, in the other information element, of the periodicity is D-F-U.

For example, a U-F-D information element structure is as follows. The quantity ("nrofDownlinkSymbols") of downlink symbols is defined as a quantity of one or more consecutive downlink symbols at an end position of a slot, and the uplink symbol ("nrofUplinkSymbols") is defined as a quantity of one or more consecutive uplink symbols at a start position of the slot.

```
TDD-UL-DL-SlotConfig ::=    SEQUENCE {
    slotindex                   TDD-UL-DL-SlotIndex,
    symbols                     CHOICE {
        allDownlink                 NULL,
        allUplink                   NULL,
        explicit                    SEQUENCE {
            nrofDownlinkSymbols         INTEGER   (1..maxNrofSymbols-1)
OPTIONAL.
            nrofUnlinkSymbols           INTEGER   (1..maxNrofSymbols-1)
OPTIONAL
        }
    }
}
```

A D-F-U information element structure is as follows. The uplink symbol (nrofUplinkSymbols) is defined as one or more uplink symbols at the end position of the slot, and the quantity (nrofDownlinkSymbols) of downlink symbols is defined as one or more downlink symbols at the start position of the slot.

```
TDD-UL-DL-SlotConfig--new ::=    SEQUENCE {
slotindex                        TDD-UL-DL-SlotIndex,
  symbols                          CHOICE {
    allDownlink                      NULL,
    allUplink                        NULL,
    explicit                         SEQUENCE {
      nrofDownlinkSymbols              INTEGER   (1..maxNrofSymbols-1)
OPTIONAL,
      nrofUplinkSymbols                INTEGER   (1..maxNrofSymbols-1)
OPTIONAL
    }
  }
}
```

Fifth Implementation:

The first implementation to the fourth implementation describe a case in which the time domain resource format information indicates U-F-D. It should be noted that, in the first implementation to the fourth implementation, the time domain resource format information may alternatively indicate another type of time domain resource format, for example, U-F-D, U-D-F, F-U-D, F-D-U, D-U-F, or D-F-U. In other words, the time domain resource format in S401 may be replaced with another type of time domain resource format.

For example, a slot format information element ("slotformat") may be added. A value of slotformat may be an enumerated type, and different values of slotformat may indicate sequential position relationships among the three time domain resources, namely, D, U, and F. In addition, a quantity (nrofDownlinkSymbols) of downlink symbols is defined as a quantity of one or more consecutive downlink symbols, is an integer from 0 to a maximum quantity ("maxNrofSymbols") of symbols, and is optional. A quantity (nrofUplinkSymbols) of uplink symbols is defined as a quantity of one or more consecutive uplink symbols, is an integer from 0 to the maximum quantity of symbols, and is optional. A quantity (nrofFlexibleSymbols) of flexible symbols is defined as a quantity of one or more consecutive flexible symbols, is an integer from 0 to the maximum quantity of symbols, and is optional.

f2, f3, f4, and f5. When slotformat does not exist, it indicates that the format of the slot is D-F-U.

Optionally, there may be five values of slotformat, and the sixth slot format may be carried by using another information element. For example, in the foregoing example, the value of slotformat may include f1, f2, f3, f4, and f5, and the slot format D-F-U may be carried by using an information element "TDD-UL-DL-SlotConfig" in an information element "TDD-UL-DL-Config" in section 6.3.2 in 38331.

The time domain resource format information is described above with reference to the first implementation to the fifth implementation. The time domain resource format information may be time domain resource format information of a DU of the first IAB node. In this case, in S402, the IAB donor may send the time domain resource format information to the DU of the first IAB node. Alternatively, the time domain resource format information in S401 and S402 may be time domain resource format information of an MT of the first IAB node. In this case, IAB donor may send the time domain resource format information to the MT of the first IAB node in S402. The following separately describes the two cases.

Optionally, in the foregoing plurality of implementations, the time domain resource format information may further indicate a resource type of one or more of the uplink time domain resource, the flexible time domain resource, and the downlink time domain resource in the first periodicity. The

```
TDD-UL-DL-SlotConfig--new ::=    SEQUENCE {
slotindex                        TDD-UL-DL-SlotIndex,
slotformat                       ENUMERATED {f1,f2,f3,f4,f5,f6}
nrofDownlinkSymbols                INTEGER   (0..maxNrofSymbols)
OPTIONAL,
nrofUplinkSymbols                  INTEGER   (0..maxNrofSymbols)
OPTIONAL,
nrofFlexibleSymbols                INTEGER   (0..maxNrofSymbols)
OPTIONAL
}
```

In an example, there may be six values of slotformat. When the value of slotformat is f1, it indicates that a format of a slot is U-F-D. When the value of slotformat is f2, it indicates that the format of the slot is U-D-F. When the value of slotformat is f3, it indicates that the format of the slot is F-U-D. When the value of slotformat is f4, it indicates that the format of the slot is F-D-U. When the value of slotformat is f5, it indicates that the format of the slot is D-U-F. When the value of slotformat is f6, it indicates that the format of the slot is D-F-U.

Optionally, there may be five values of slotformat, and slotformat is optional. When slotformat does not exist, the sixth slot format is indicated by default. For example, in the foregoing example, the value of slotformat may include f1, resource type includes a hard type, a soft type, or a not-available (N/A) type. The hard type indicates that a time domain resource is always available. The soft type indicates that a further indication is required to determine a time domain resource. For example, an indication from a parent node is further required. The N/A type indicates that a time domain resource is unavailable.

Case 1: The Time Domain Resource Format Information is the Time Domain Resource Format Information of the DU of the First IAB Node.

The IAB donor generates the time domain resource format information of the DU of the first IAB node. For example, the IAB donor may coordinately determine, based on a status of interference between links in the IAB network, a time domain resource of each link, then determine time domain resource format information of a DU of each IAB node, and send, to each IAB node, the time domain resource format information of the DU of each IAB node. Alternatively, the time domain resource format information of the DU of the first IAB node may be generated by an operation, administration, and maintenance (OAM) network element. For example, the OAM network element may coordinately determine, based on a status of interference between links in the IAB network, a time domain resource of each link, then determine time domain resource format information of a DU of each IAB node, and send, to the IAB donor, the time domain resource format information of the DU of each IAB node. Finally, the IAB donor sends, to each IAB node, the time domain resource format information of the DU of each IAB node.

The DU of the first IAB node may include one or more cells. Optionally, the time domain resource format information of the DU of the first IAB node may be time domain resource format information of a cell under the DU of the first IAB node, or may be time domain resource format information of one or more cells under the DU of the first IAB node. In this case, it may be understood that the time domain resource format information of the DU of the first IAB node is applicable to the one or more cells under the DU of the first IAB node.

Optionally, in the case 1, the time domain resource format information may further indicate the resource type of one or more of the uplink time domain resource, the flexible time domain resource, and the downlink time domain resource in the first periodicity. The resource type includes a hard type, a soft type, or a not-available (N/A) type. The hard type indicates that a time domain resource is always available. The soft type indicates that a further indication is required to determine a time domain resource. For example, an indication from a parent node is further required. The N/A type indicates that a time domain resource is unavailable.

Optionally, in the case 1, the time domain resource format information may be carried by using an F1AP message, which may be specifically as follows: (1) The time domain resource format information is carried in an F1 setup response message sent by a CU to the IAB DU. (2) The time domain resource format information is carried in a gNB-DU configuration update acknowledgment message sent by a CU to the IAB DU. (3) The time domain resource format information is carried in a gNB-DU configuration update message sent by a CU to the IAB DU. (4) The time domain resource format information is carried in a gNB-DU resource coordination request message sent by a CU to the IAB DU. (5) The time domain resource format information is alternatively carried in another newly defined F1AP message.

Optionally, if the time domain format information does not indicate the resource type, the IAB donor and the first IAB node may predefine the resource type of one or more of the uplink time domain resource, the flexible time domain resource, and the downlink time domain resource in the first periodicity. For example, if the time domain format information does not indicate the resource type, the IAB donor and the first IAB node may predefine that the uplink time domain resource, the flexible time domain resource, and the downlink time domain resource in the first periodicity are of the hard type.

Case 2: The Time Domain Resource Format Information is the Time Domain Resource Format Information of the MT of the First TAB Node.

In a first implementation, the parent node (for example, a DU of the parent node) of the first IAB node may generate the time domain resource format information of the MT of the first IAB node, then the parent node (for example, the DU of the parent node) of the first IAB node sends the time domain resource format information of the MT of the first IAB node to the IAB donor, and the IAB donor sends the time domain resource format information to the MT of the first IAB node. As shown in FIG. 3A, the IAB node 1 is a parent node of the IAB node 2. A DU of the IAB node 1 may generate time domain resource format information of an MT of the IAB node 2. The DU of the IAB node 1 sends the time domain resource format information of the MT of the IAB node 2 to the IAB donor, and then the IAB donor sends the time domain resource format information of the MT of the IAB node 2 to the IAB node 2.

For example, the parent node of the first IAB node sends, by using an F1AP message between the parent node of the first IAB node and the IAB donor, the time domain resource format information of the MT of the first IAB node to the IAB donor, and the IAB donor sends the time domain resource format information of the MT of the first IAB node to the MT of the first IAB node by using an RRC message. The RRC message may be encapsulated in F1AP signaling between the parent node of the first IAB node and the IAB donor. Optionally, in addition to the time domain resource format information, the RRC message may further include the foregoing time domain resource length information at the cell granularity and/or the time domain resource length information at the IAB node granularity.

It may be understood that when downlink transmission is performed on a link, a DU of a parent node on the link sends downlink data to an MT of a child node on a downlink transmission time domain resource. Correspondingly, the MT of the child node on the link receives the downlink data from the DU of the parent node on the downlink transmission time domain resource. Similarly, when uplink transmission is performed on a link, a DU of a parent node on the link receives uplink data from an MT of a child node on an uplink transmission time domain resource. Correspondingly, the MT of the child node on the link sends the uplink data to the DU of the parent node on the uplink transmission time domain resource.

Therefore, a downlink time domain resource of the MT of the first IAB node may be a part or all of downlink time domain resources of the DU of the parent node of the first IAB node (when the downlink time domain resource is a part, it may be understood that the DU of the parent node and the MT of the first IAB node do not perform downlink transmission on a remaining part of downlink time domain resources). An uplink time domain resource of the MT of the first IAB node may be a part or all of uplink time domain resources of the DU of the parent node of the first IAB node (when the uplink time domain resource is a part, it may be understood that the DU of the parent node and the MT of the first IAB node do not perform uplink transmission on a remaining part of uplink time domain resources).

Therefore, the DU of the parent node of the first IAB node may generate the time domain resource format information of the MT of the first IAB node based on the time domain resource format of the DU. Optionally, the DU of the parent node of the first IAB node may further generate the time domain resource format information of the MT of the first IAB node by considering another factor. For example, if the first IAB node does not support full duplex but supports only half duplex, the parent node of the first IAB node may generate the time domain resource format information of the MT of the first IAB node based on the time domain resource format information of the DU of the parent node of the first IAB node and the time domain resource format information of the DU of the first IAB node. Therefore, on the one hand, an uplink time domain resource (or a downlink time domain resource) of the MT of the first IAB node is a subset of the uplink time domain resource (or the downlink time domain resource) of the DU of the parent node of the first IAB node; on the other hand, the DU and the MT of the first IAB node do not simultaneously perform receiving and sending (simultaneously receiving and sending may be understood as that, the downlink time domain resource of the DU is exactly the downlink time domain resource of the MT, and therefore the MT receives downlink data from a parent node when the DU sends downlink data to a child node; or the uplink time domain resource of the DU is exactly the uplink time domain resource of the MT, and therefore the MT sends uplink data to a parent node when the DU receives uplink data from a child node).

In a second implementation, the IAB donor may generate the time domain resource format information of the MT of the first IAB node, and then the IAB donor sends the time domain resource format information to the MT of the first IAB node.

Because the IAB donor may obtain the time domain resource format information of the DU of each IAB node in the IAB network, the IAB donor may generate the time domain resource format information of the MT of the first IAB node based on the time domain resource format information of the DU of the parent node of the first IAB node. For a specific generation manner, refer to the content of generating the time domain resource format information of the MT of the first IAB node by the DU of the parent node of the first IAB node in the first implementation. Details are not described herein again.

With reference to FIG. 6A to FIG. 9, the following further describes how the IAB donor configures a time domain resource format for a DU and an MT of an IAB node.

Figure 6A:
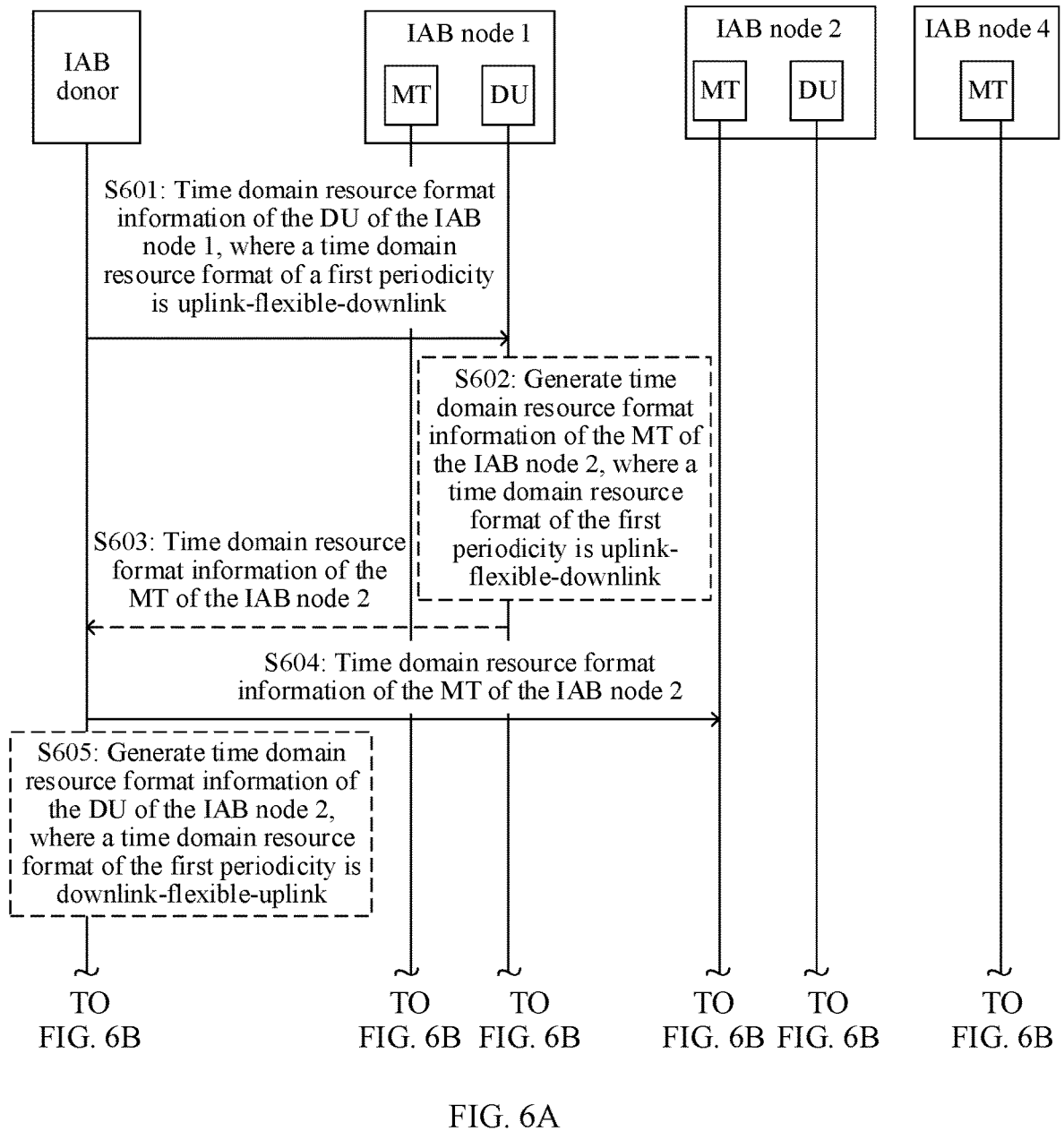
FIG. 6A and FIG. 6B are a diagram of signaling exchange of another time domain resource format configuration method according to an embodiment of this application.
Figure 6B:
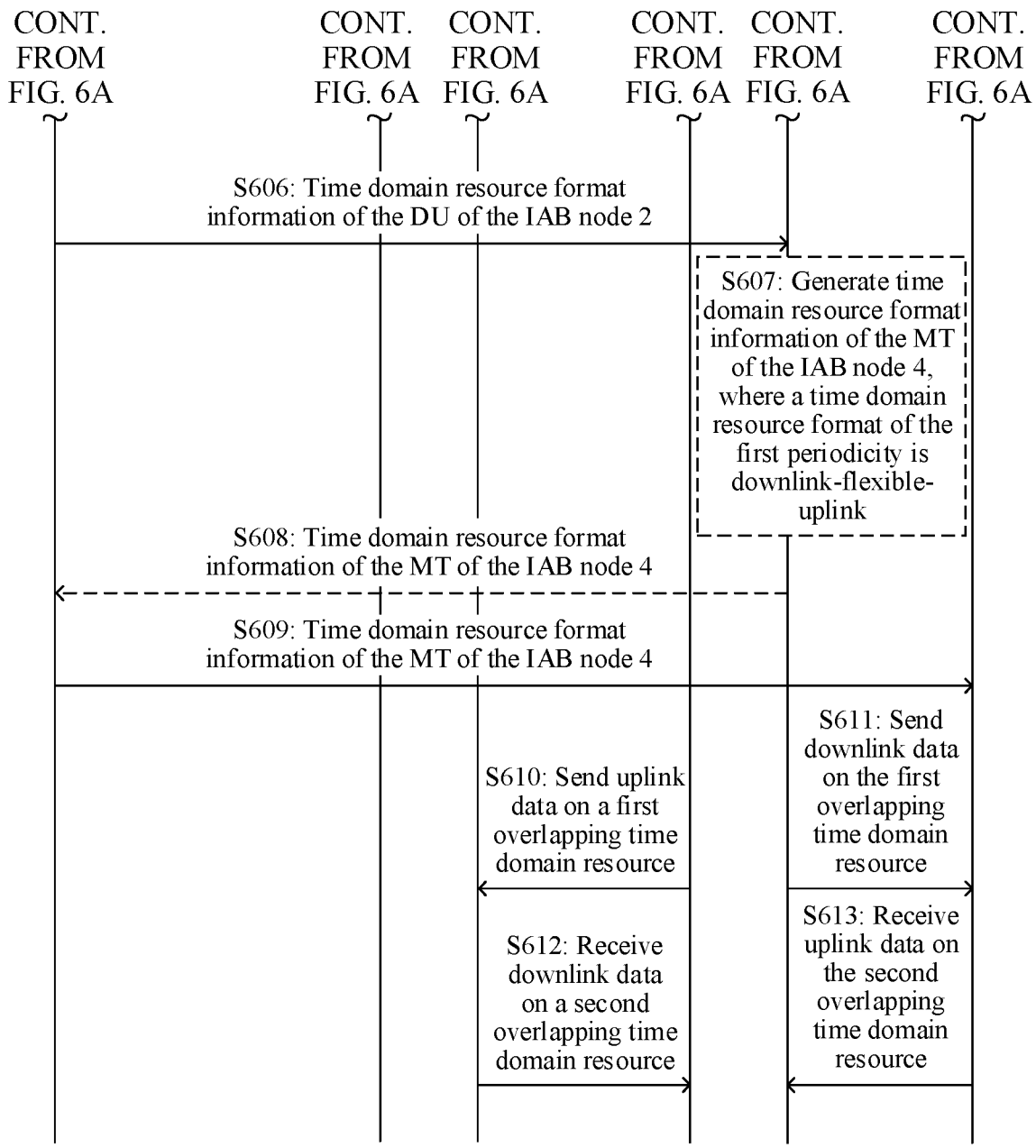
Figure 7:
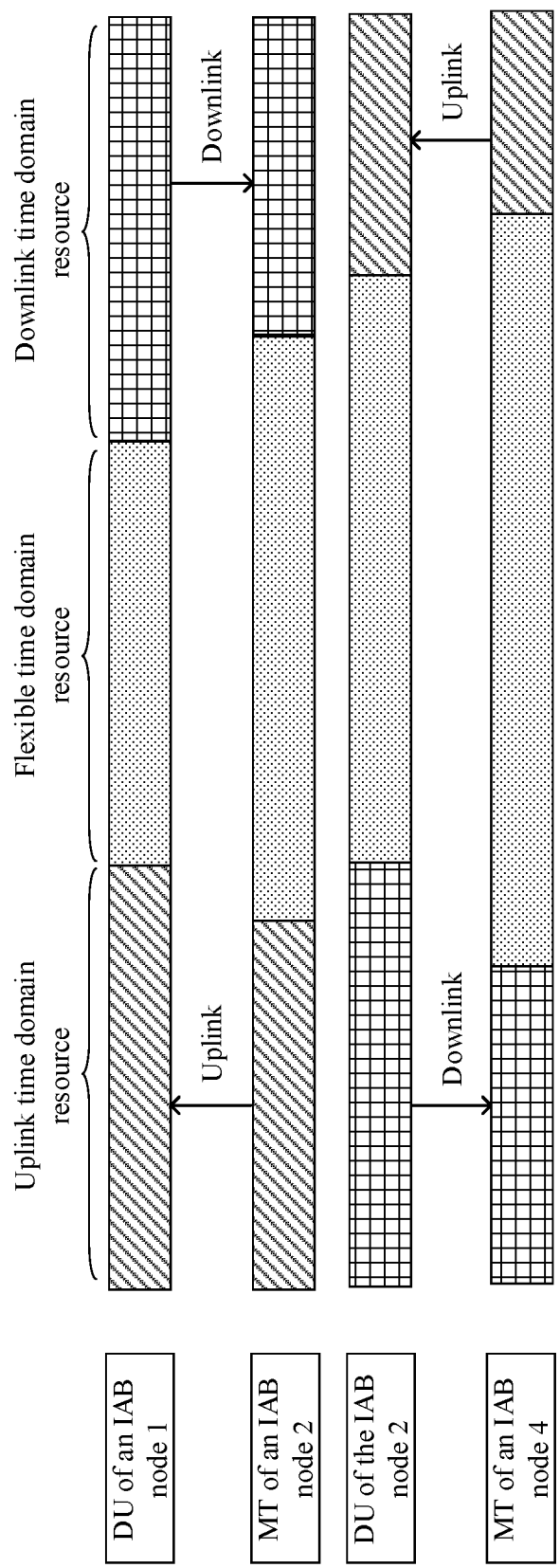
FIG. 7 is another schematic diagram of a time domain resource according to an embodiment of this application.

FIG. 6A and FIG. 6B is a diagram of signaling exchange of another time domain resource format configuration method according to an embodiment of this application. FIG. 7 is another schematic diagram of a time domain resource. It should be noted that, for the time domain resource format information configuration method in FIG. 6A and FIG. 6B and FIG. 7, refer to related content in FIG. 4. Descriptions are provided below with reference to FIG. 6A and FIG. 6B and FIG. 7. As shown in FIG. 6A and FIG. 6B, the method includes the following steps.

S601: An IAB donor sends time domain resource format information of a DU of an IAB node 1 to the IAB node 1.

As shown in FIG. 7, for the DU of the IAB node 1, a time domain resource format of a first periodicity is uplink-flexible-downlink (U-F-D).

For a specific configuration manner, refer to the first implementation to the sixth implementation of the time domain resource format information in FIG. 4.

S602: The DU of the IAB node 1 generates time domain resource format information of an MT of an IAB node 2.

As shown in FIG. 7, for the MT of the IAB node 2, a time domain resource format of the first periodicity is uplink-flexible-downlink.

Optionally, the DU of the IAB node 1 may generate the time domain resource format information of the MT of the IAB node 2 based on the time domain resource format of the DU. For example, an uplink time domain resource of the MT of the IAB node 2 may be a part or all of uplink time domain resources of the DU of the IAB node 1, and a downlink time domain resource of the MT of the IAB node 2 may be a part or all of downlink time domain resources of the DU of the IAB node 1.

Optionally, the DU of the IAB node 1 may alternatively generate time domain resource format information of an MT of the IAB node 1 based on time domain resource format information of a DU of the IAB node 2. For details, refer to the content in the foregoing embodiments.

S603: The IAB node 1 sends the time domain resource format information of the MT of the IAB node 2 to the IAB donor.

S604: The IAB donor sends the time domain resource format information of the MT of the IAB node 2 to the MT of the IAB node 2.

For S602 to S604, refer to related content in "Case 2: The time domain resource format information is the time domain resource format information of the MT of the first IAB node" in FIG. 4.

Optionally, S602 and S603 may not exist, and only S604 exists. The IAB donor directly generates the time domain resource format information of the DU of the IAB node 2. For details, refer to related content in "Case 2: The time domain resource format information is the time domain resource format information of the MT of the first IAB node" in FIG. 4.

S605: The IAB donor generates the time domain resource configuration information of the DU of the IAB node 2.

For example, as shown in FIG. 7, for the DU of the IAB node 2, a time domain resource format of the first periodicity is downlink-flexible-uplink.

For a specific configuration manner, refer to the first implementation to the sixth implementation of the time domain resource format information in FIG. 4.

S606: The IAB donor sends the time domain resource format information of the DU of the IAB node 2 to the DU of the IAB node 2.

S607: The DU of the IAB node 2 generates time domain resource configuration information of an MT of an IAB node 4.

For example, as shown in FIG. 7, for the MT of the IAB node 4, a time domain resource format of the first periodicity is downlink-flexible-uplink.

For a specific configuration manner, refer to the first implementation to the sixth implementation of the time domain resource format information in FIG. 4.

S608: The DU of the IAB node 2 sends the time domain resource configuration information of the MT of the IAB node 4 to the IAB donor.

S609: The IAB donor sends the time domain resource configuration information of the MT of the IAB node 4 to the MT of the IAB node 4.

S610: The MT of the IAB node 2 sends uplink data to the DU of the IAB node 1 on a first overlapping time domain resource.

S611: The DU of the IAB node 2 sends downlink data to the MT of the IAB node 4 on the first overlapping time domain resource.

In S610 and S611, the first overlapping time domain resource includes a time domain resource that overlaps all of an uplink time domain resource of the MT of the IAB node 2, an uplink time domain resource of the DU of the IAB node 1, a downlink time domain resource of the DU of the IAB node 2, and a downlink time domain resource of the MT of the IAB node 4. It may be understood that S610 and S611 occur simultaneously.

S612: The MT of the IAB node 2 receives downlink data from the DU of the IAB node 1 on a second overlapping time domain resource.

S613: The DU of the IAB node 2 receives uplink data from the MT of the IAB node 4 on the second overlapping time domain resource.

In S612 and S613, the second overlapping time domain resource includes a time domain resource that overlaps all of a downlink time domain resource of the MT of the IAB node 2, a downlink time domain resource of the DU of the IAB node 1, an uplink time domain resource of the DU of the IAB node 2, and an uplink time domain resource of the MT of the IAB node 4. It may be understood that S612 and S613 occur simultaneously.

S610 to S613 are all optional. Alternatively, S610 and S611 may exist, and S612 and S613 do not exist. Alternatively, S612 and S613 may exist, and S610 and S611 do not exist.

Optionally, the overlapping time domain resource may be one or more slots and/or one or more symbols.

Optionally, in FIG. 7, a time domain resource of the DU of the IAB node 1 may be an uplink slot, and the uplink slot is at a corresponding position in the MT of the IAB node 2. There is a downlink slot at a corresponding position in the DU of the IAB node 2, and the downlink slot is at a corresponding position in the MT of the IAB node 4. Therefore, when the MT of the IAB node 2 sends uplink data to the DU of the IAB node 1 in the slot, the DU of the IAB node 2 may send downlink data to the MT of the IAB node 4 in the slot.

With reference to FIG. 6A and FIG. 6B and FIG. 7, that the time domain resource format configured for the MT of the IAB node 2 in the first periodicity is uplink-flexible-downlink, and the time domain resource format configured for the DU of the IAB node 2 in the first periodicity is downlink-flexible-uplink is described. In another implementation of FIG. 6A and FIG. 6B, the time domain resource format configured for the MT of the IAB node 1 in the first periodicity may alternatively be downlink-flexible-uplink, and the time domain resource format configured for the DU of the IAB node 1 in the first periodicity may alternatively be uplink-flexible-downlink. Descriptions are provided below with reference to FIG. 8A and FIG. 8B and FIG. 9, and mutual reference may be made to the content in FIG. 6A and FIG. 6B and FIG. 7.

Figure 8A:
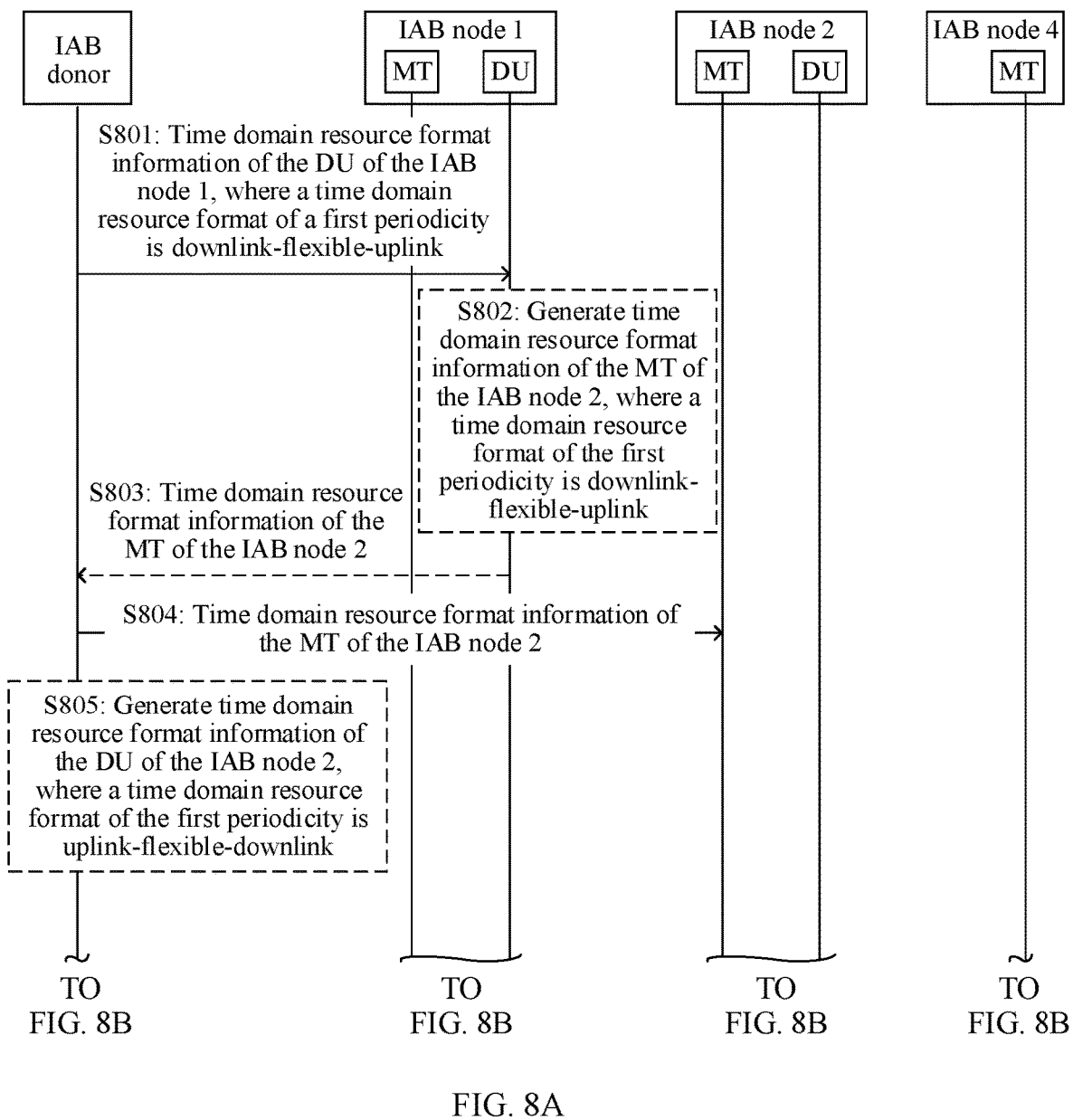
FIG. 8A and FIG. 8B are a diagram of signaling exchange of another time domain resource format configuration method according to an embodiment of this application.
Figure 8B:
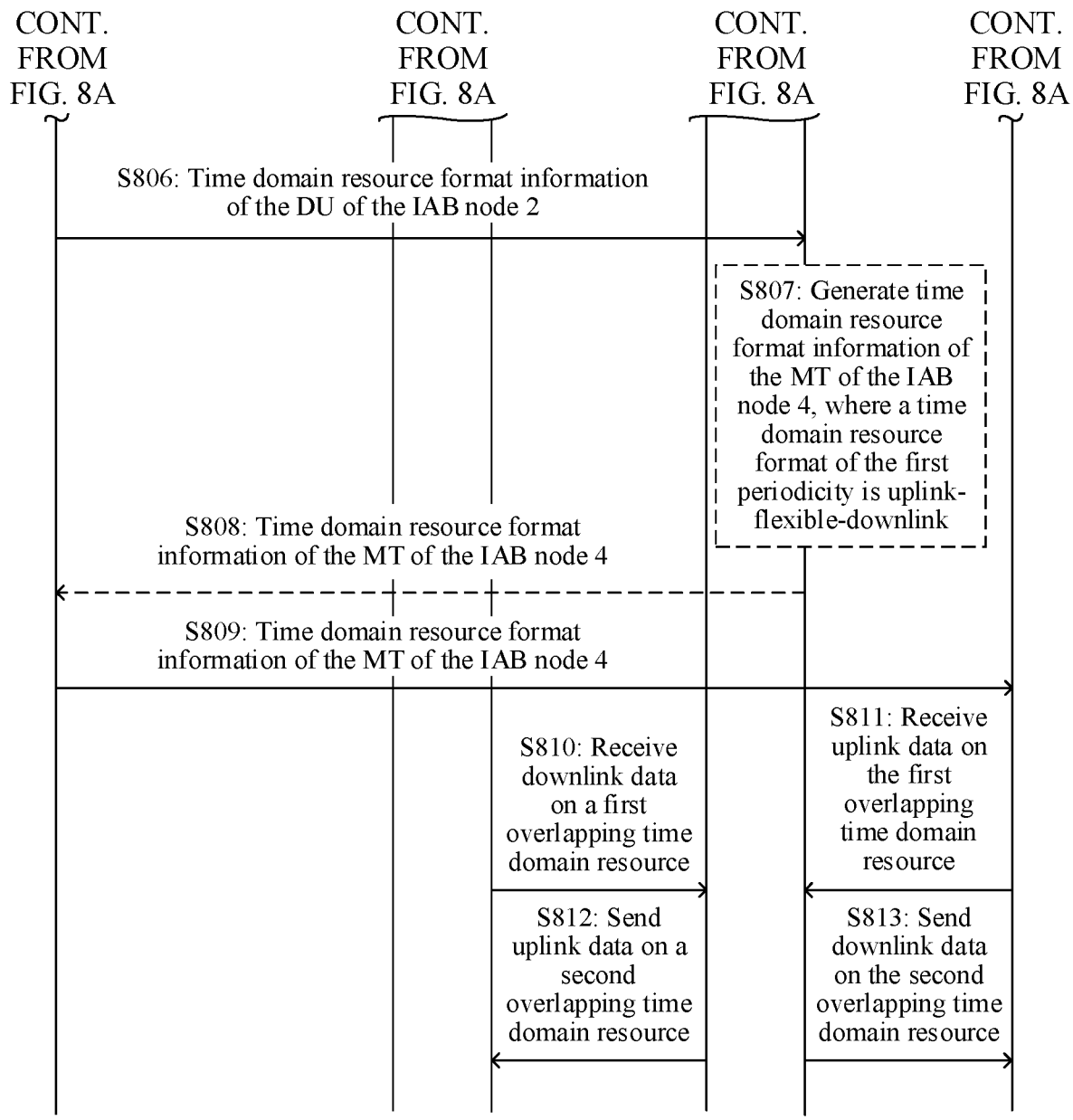
Figure 9:
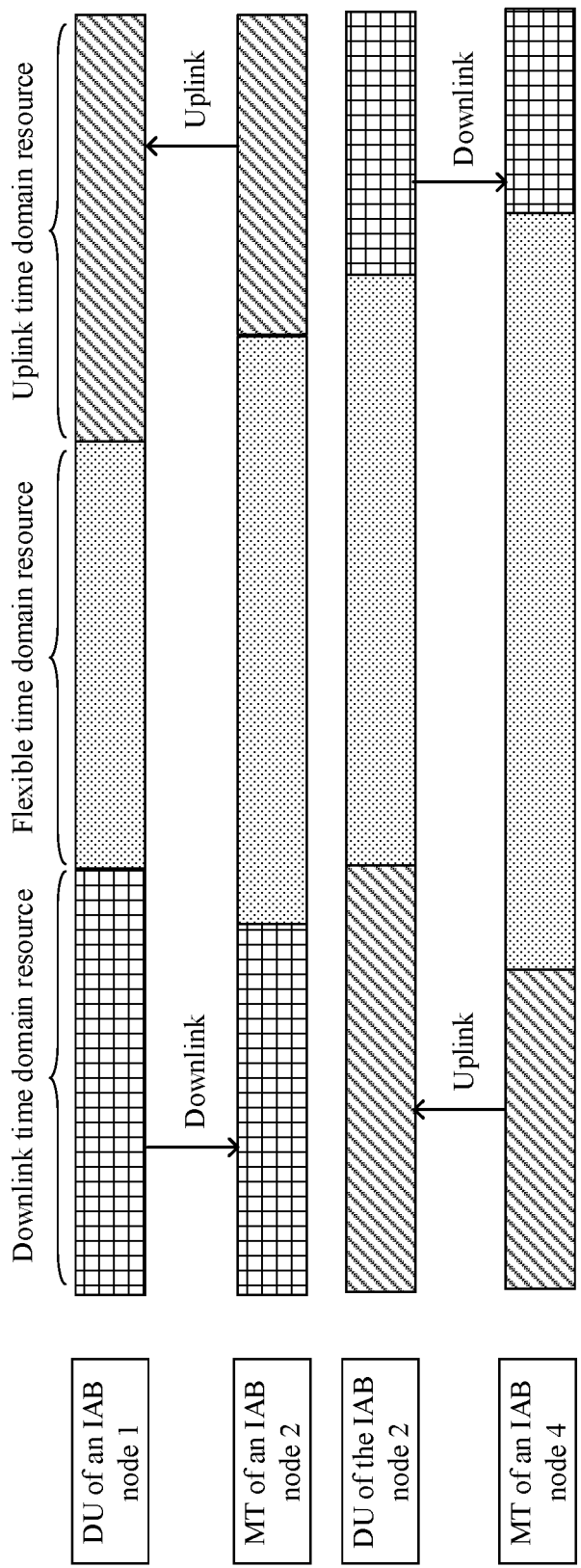
FIG. 9 is another schematic diagram of a time domain resource according to an embodiment of this application.

FIG. 8A and FIG. 8B are a diagram of signaling exchange of another time domain resource format configuration method according to an embodiment of this application. FIG. 9 is another schematic diagram of a time domain resource. It should be noted that, for the time domain resource format information configuration method in FIG. 8A and FIG. 8B and FIG. 9, refer to related content in FIG. 4 to FIG. 7. Descriptions are provided below with reference to FIG. 8A and FIG. 8B and FIG. 9. As shown in FIG. 8A and FIG. 8B, the method includes the following steps.

S801: An IAB donor sends time domain resource format information of a DU of an IAB node 1 to the DU of the IAB node 1.

For example, as shown in FIG. 9, the time domain resource format information of the DU of the IAB node 1 indicates that a time domain resource format of a first periodicity is downlink-flexible-uplink.

For a specific configuration manner, refer to the first implementation to the sixth implementation of the time domain resource format information in FIG. 4.

S802: The DU of the IAB node 1 generates time domain resource format information of an MT of an IAB node 2.

For example, as shown in FIG. 9, for the MT of the IAB node 2, a time domain resource format of the first periodicity is downlink-flexible-uplink.

Optionally, the DU of the IAB node 1 may generate the time domain resource format information of the MT of the IAB node 2 based on the time domain resource format of the DU. For example, an uplink time domain resource of the MT of the IAB node 2 may be a part or all of uplink time domain resources of the DU of the IAB node 1, and a downlink time domain resource of the MT of the IAB node 2 may be a part or all of downlink time domain resources of the DU of the IAB node 1.

Optionally, the DU of the IAB node 1 may alternatively generate time domain resource format information of an MT of the IAB node 1 based on time domain resource format information of a DU of the IAB node 2. For details, refer to the content in the foregoing embodiments.

S803: The IAB node 1 sends the time domain resource format information of the MT of the IAB node 2 to the IAB donor.

S804: The IAB donor sends the time domain resource format information of the MT of the IAB node 2 to the MT of the IAB node 2.

Optionally, for S802 to S804, refer to related content in "Case 2: The time domain resource format information is the time domain resource format information of the MT of the first IAB node" in FIG. 4.

Optionally, S802 and S803 may not exist, and only S804 exists. The IAB donor directly generates the time domain resource format information of the DU of the IAB node 2. For details, refer to related content in "Case 2: The time domain resource format information is the time domain resource format information of the MT of the first IAB node" in FIG. 4.

S805: The IAB donor generates the time domain resource configuration information of the DU of the IAB node 2.

For example, as shown in FIG. 9, for the DU of the IAB node 2, a time domain resource format of the first periodicity is uplink-flexible-downlink.

For a specific configuration manner, refer to the first implementation to the sixth implementation of the time domain resource format information in FIG. 4.

S806: The IAB donor sends the time domain resource format information of the DU of the IAB node 2 to the DU of the IAB node 2.

S807: The DU of the IAB node 2 generates time domain resource configuration information of an MT of an IAB node 4.

For example, as shown in FIG. 9, for the MT of the IAB node 4, a time domain resource format of the first periodicity is uplink-flexible-downlink.

For a specific configuration manner, refer to the first implementation to the sixth implementation of the time domain resource format information in FIG. 4.

S808: The DU of the IAB node 2 sends the time domain resource configuration information of the MT of the IAB node 4 to the IAB donor.

S809: The IAB donor sends the time domain resource configuration information of the MT of the IAB node 4 to the MT of the IAB node 4.

S810: The MT of the IAB node 2 receives downlink data from the DU of the IAB node 1 on a first overlapping time domain resource.

S811: The DU of the IAB node 2 receives uplink data from the MT of the IAB node 4 on the first overlapping time domain resource.

In S810 and S811, the first overlapping time domain resource includes a time domain resource that overlaps all of a downlink time domain resource of the MT of the IAB node 2, a downlink time domain resource of the DU of the IAB node 1, an uplink time domain resource of the DU of the IAB node 2, and an uplink time domain resource of the MT of the IAB node 4. It may be understood that S810 and S811 occur simultaneously.

S812: The MT of the IAB node 2 sends uplink data to the DU of the IAB node 1 on a second overlapping time domain resource.

S813: The DU of the IAB node 2 sends downlink data to the MT of the IAB node 4 on the second overlapping time domain resource.

In S812 and S813, the second overlapping time domain resource includes a time domain resource that overlaps all of an uplink time domain resource of the MT of the IAB node 2, an uplink time domain resource of the DU of the IAB node 1, a downlink time domain resource of the DU of the IAB node 2, and a downlink time domain resource of the MT of the IAB node 4. It may be understood that S812 and S813 occur simultaneously.

Optionally, the overlapping time domain resource may be one or more slots and/or one or more symbols.

For other content, refer to the content in S610 to S613 in FIG. 6B.

S810 to S813 are all optional. Alternatively, S810 and S811 may exist, and S812 and S813 do not exist. Alternatively, S812 and S813 may exist, and S810 and S811 do not exist.

Figure 10:
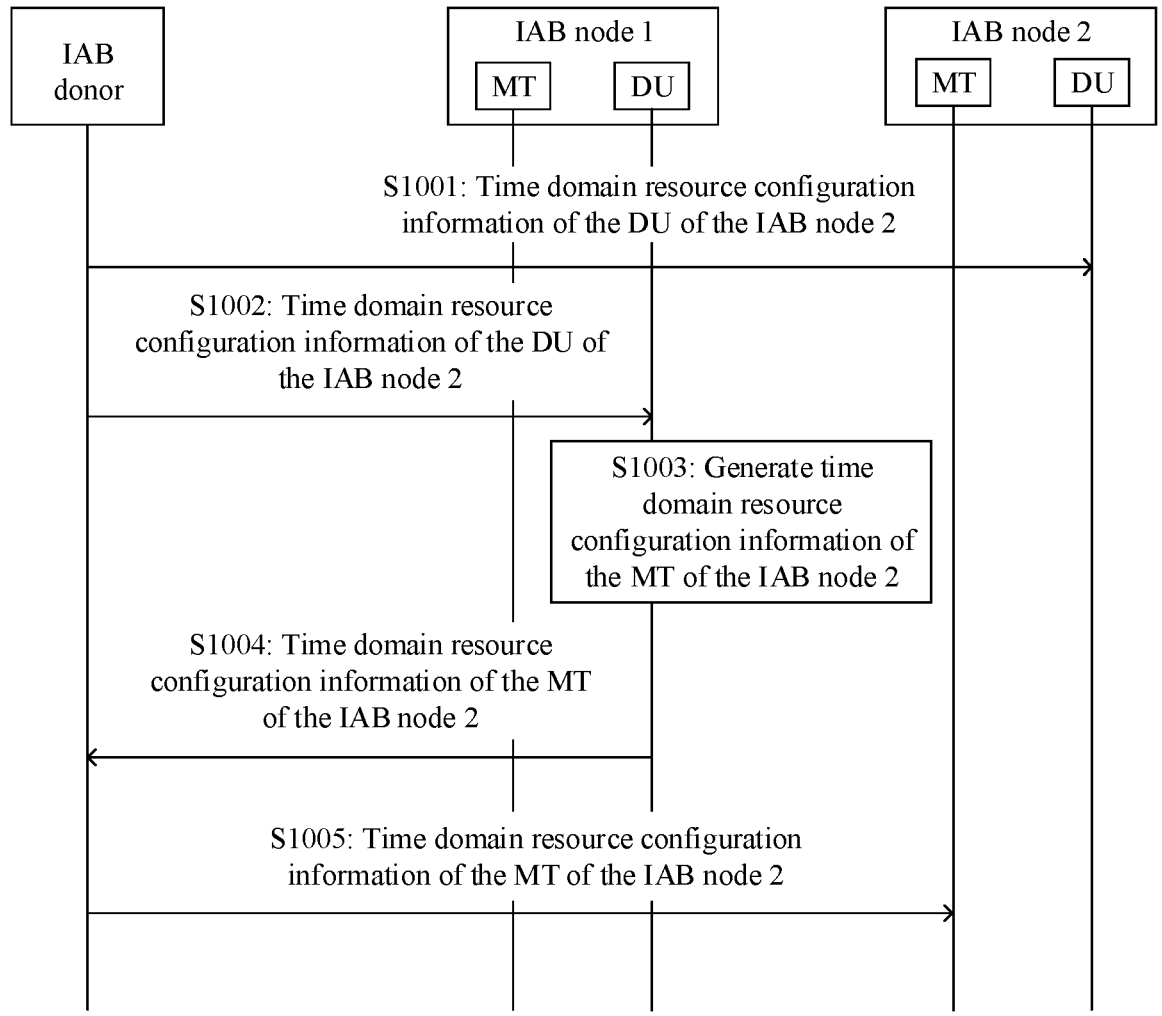
FIG. 10 is a diagram of signaling exchange of another time domain resource format configuration method according to an embodiment of this application.

The foregoing describes, with reference to various embodiments, how to configure the time domain resource formats for the MT and the DU of the IAB node. After the time domain resource formats are configured for the DU and the MT of the IAB node, if the time domain resource format information of the DU of the IAB node and the time domain resource format information of the MT take effect at different moments (which is referred to as a scenario 1 below for ease of description), a conflict may be caused. For example, a full duplex problem such as simultaneous transmission and simultaneous reception may be caused. If time domain resource format information of an MT of a parent node and time domain resource format information of a DU of a child node on a link take effect at different moments (which is referred to as a scenario 2 below for ease of description), a conflict may be caused. For example, a transmit end starts to send data, but a time domain resource configuration of a receive end has not taken effect. Consequently, no data is received, and a data loss is caused. With reference to FIG. 10 to FIG. 11B, the following describes how to define an effective moment of the DU or the MT of the IAB node, to avoid the problems in the foregoing scenario 1 and scenario 2.

It should be noted that time domain resource configuration information in FIG. 10 to FIG. 11B may include the time domain resource format information and/or the time domain resource length information described in the embodiments in FIG. 4 to FIG. 9. This is not limited in embodiments of this application. In embodiments of this application, that the time domain resource configuration information takes effect may be understood as that an IAB node receiving the time domain resource configuration information may use a time domain resource indicated by the time domain resource configuration information to perform data transmission. That the time domain resource configuration information does not take effect may be understood as that after receiving the time domain resource configuration information, an IAB node does not use a time domain resource indicated by the time domain resource configuration information to perform data transmission. For example, the IAB node may first store the time domain resource configuration information.

Scenario 1: A DU and an MT of a Same IAB Node (1) When an MT of an IAB node receives time domain resource configuration information of the MT of the IAB node, the time domain resource configuration information of the MT of the IAB node takes effect, and a time domain resource configuration of a DU of the IAB node takes effect.

FIG. 10 is a diagram of signaling exchange of a time domain resource format configuration method according to an embodiment of this application. As shown in FIG. 10, the method includes the following steps.

S1001: An IAB donor sends time domain resource configuration information of a DU of an IAB node 2 to the DU of the IAB node 2.

Optionally, before S1001, the IAB donor may send the time domain resource configuration information of the DU of the IAB node 2 to the IAB node 2. In S1001, the IAB donor updates the time domain resource configuration information of the DU of the IAB node 2, and then sends updated time domain resource configuration information of the DU of the IAB node 2 to the DU of the IAB node 2.

When the DU of the IAB node 2 receives the time domain resource configuration information of the DU of the IAB node 2, the time domain resource configuration information does not take effect immediately. For example, the IAB node 2 may continue to use the time domain resource configuration information of the DU of the IAB node 2 that is not updated.

Optionally, the IAB node 2 may be configured, so that the time domain resource configuration information of the DU does not take effect immediately when the time domain resource configuration information of the DU is received. Instead, the time domain resource configuration information of the DU takes effect when time domain resource configuration information of an MT is received. For example, configuration may be performed in a manner in which the IAB donor sends indication information to the IAB node 2. For another example, configuration may be performed in a manner in which the IAB node 2 is preconfigured or predefined (for example, statically writing in the IAB donor and the IAB node 2). Optionally, the time domain resource configuration information of the DU of the IAB node 2 may be carried in an F1AP message sent by the IAB donor to an IAB node 1.

S1002: The IAB donor sends the time domain resource configuration information of the DU of the IAB node 2 to the IAB node 1.

Optionally, the time domain resource configuration information of the DU of the IAB node 2 that is sent by the IAB donor to the IAB node 1 in S1002 may be different from the time domain resource configuration information of the DU of the IAB node 2 that is sent by the IAB donor to the IAB node 2 in S1001. For example, the time domain resource configuration information of the DU of the IAB node 2 that is sent to the IAB node 1 in S1002 may be a part or all of the time domain resource configuration information of the DU of the IAB node 2 that is sent to the DU of the IAB node 2 in S1001. For example, the time domain resource configuration information of the DU of the IAB node 2 that is sent to the IAB node 1 in S1002 may carry only some necessary information, to enable the IAB node 1 to determine a time domain resource configuration of the DU of the IAB node 2, and the entire time domain resource configuration information of the DU in S1001 does not need to be sent to the IAB node 1.

Optionally, the time domain resource configuration information of the DU of the IAB node 2 may be carried in an F1AP message sent by the IAB donor to the IAB node 1.

S1003: A DU of the IAB node 1 generates time domain resource configuration information of an MT of the IAB node 2.

The DU of the IAB node 1 may generate the time domain resource configuration information of the MT of the IAB node 2 based on the time domain resource configuration information of the DU of the IAB node 2.

Optionally, an uplink time domain resource of the MT of the IAB node 2 and an uplink time domain resource of the DU of the IAB node 2 are staggered with each other in time domain, and a downlink time domain resource of the MT of the IAB node 2 and a downlink time domain resource of the DU of the IAB node 2 are staggered with each other in time domain. In other words, the IAB node 2 does not simultaneously perform receiving and sending.

Optionally, the IAB node 1 may generate the time domain resource configuration information of the MT of the IAB node 2 based on the time domain resource configuration information of the DU of the IAB node 2 and time domain resource configuration information of the DU of the IAB node 1.

Optionally, an uplink time domain resource of the MT of the IAB node 2 is a part or all of uplink time domain resources of the DU of the IAB node 1, and a downlink time domain resource of the MT of the IAB node 2 is a part or all of downlink time domain resources of the DU of the IAB node 1.

S1004: The IAB node 1 sends the time domain resource configuration information of the MT of the IAB node 2 to the IAB donor.

Optionally, the time domain resource configuration information of the MT of the IAB node 2 may be carried in an F1AP message sent by the IAB node 1 to the IAB donor.

S1005: The IAB donor sends the time domain resource configuration information of the MT of the IAB node 2 to the IAB node 2.

After the MT of the IAB node 2 receives the time domain resource configuration information of the MT of the IAB node 2, the time domain resource configuration information of the DU of the IAB node 2 that is received in S1001 may take effect, and the time domain resource configuration information of the MT of the IAB node 2 may take effect.

Optionally, the time domain resource configuration information of the MT of the IAB node 2 is carried in an RRC message sent by the IAB donor to the MT of the IAB node 2. The RRC message may be encapsulated in an F1AP message sent by the IAB donor to the IAB node 1 for sending, and may be sent by using a data radio bearer or a signaling radio bearer between the IAB node 1 and the IAB node 2.

For content in S1003 to S1005, refer to the content in FIG. 4 to FIG. 9. Details are not described herein again.

The scenario in FIG. 10 is applicable to a scenario in which time domain resource configuration information of a DU and an MT of an IAB node is updated in an IAB network. In this way, the following case is avoided: Before the MT of the IAB node 2 receives updated time domain resource configuration information of the MT of the IAB node 2, the DU of the IAB node 2 has received the updated time domain resource configuration information of the DU of the IAB node 2, and the updated time domain resource configuration information of the DU has taken effect. As a result, a conflict is caused between the updated time domain resource configuration information of the DU and the time domain resource configuration information of the MT that is not updated. For example, a duplex problem of simultaneous transmission and reception occurs on the IAB node 2.

(2) When an MT of an IAB node receives time domain resource configuration information of the MT, the time domain resource configuration information takes effect immediately.

Figure 11A:
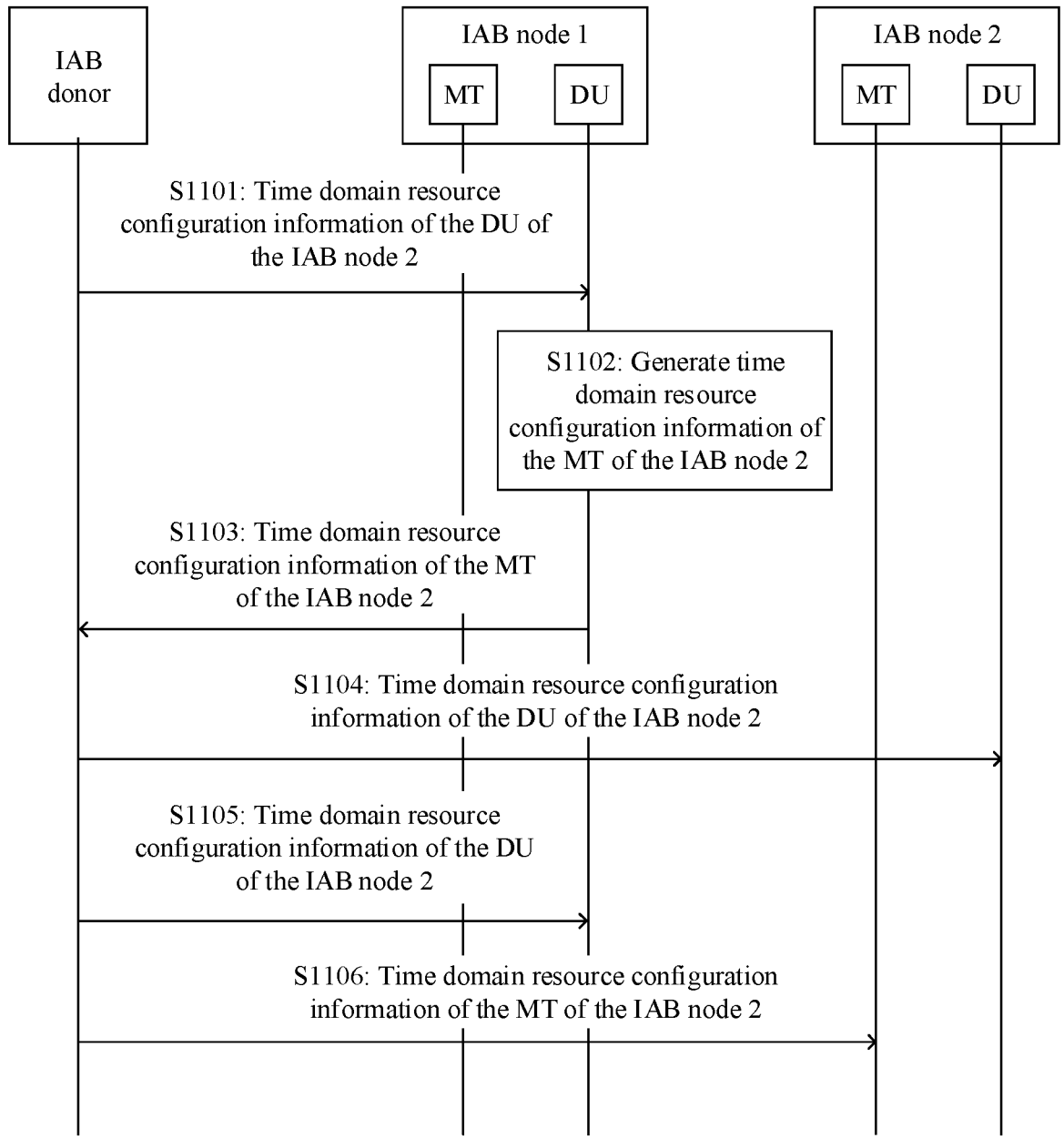
FIG. 11A is a diagram of signaling exchange of another time domain resource format configuration method according to an embodiment of this application.
Figure 11B:
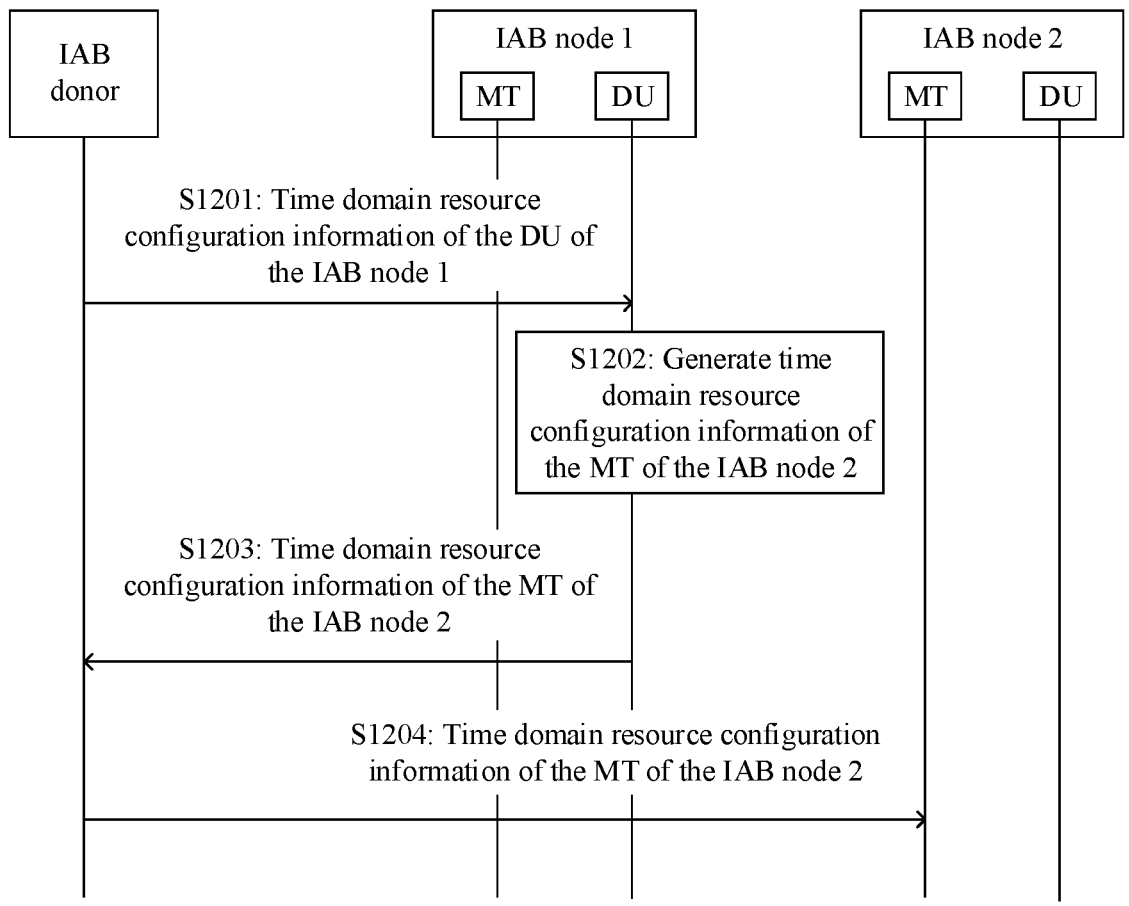
FIG. 11B is a diagram of signaling exchange of a time domain resource format configuration method according to an embodiment of this application.

FIG. 11A is a diagram of signaling exchange of a time domain resource format configuration method according to an embodiment of this application. As shown in FIG. 11A, the method includes the following steps.

S1101: An IAB donor sends time domain resource configuration information of a DU of an IAB node 2 to a DU of an IAB node 1.

Optionally, the time domain resource configuration information of the DU of the IAB node 2 that is sent to the DU of the IAB node 1 in S1101 may be different from time domain resource configuration information of the DU of the IAB node 2 that is sent by the IAB donor to the IAB node 2. For details, refer to the content in S1002, and details are not described herein again.

S1102: The DU of the IAB node 1 generates time domain resource configuration information of an MT of the IAB node 2.

S1103: The DU of the IAB node 1 sends the time domain resource configuration information of the MT of the IAB node 2 to the IAB donor.

S1104: The IAB donor sends the time domain resource configuration information of the MT of the IAB node 2 to the MT of the IAB node 2.

After the MT of the IAB node 2 receives the time domain resource configuration information of the MT of the IAB node 2, the time domain resource configuration information takes effect immediately.

The scenario in FIG. 11A is applicable to updating the time domain resource configuration information of the MT of the IAB node 2 when the time domain resource configuration information of the DU of the IAB node 2 remains unchanged. Because the DU of the IAB node 1 generates the time domain resource configuration information of the MT of the IAB node 2 based on the time domain resource configuration information of the DU of the IAB node 2, a full duplex problem of simultaneous transmission and reception does not occur on the IAB node. Therefore, it may be configured or defined that when the MT of the IAB node 2 receives the time domain resource configuration information of the MT, the time domain resource configuration information takes effect immediately.

(3) When an MT of an IAB node first receives time domain resource configuration information of the MT, the time domain resource configuration information takes effect only after a DU of the IAB node receives time domain resource configuration information of the DU of the IAB node. In addition, when the DU of the IAB node first receives the time domain resource configuration information, the time domain resource configuration information takes effect only after the MT of the IAB node receives the time domain resource configuration information of the MT of the IAB node.

Optionally, if both the time domain resource configuration information of the MT of the IAB node and the time domain resource configuration information of the DU of the IAB node are generated by an IAB donor and correspondingly sent to the MT of the IAB node and the DU of the IAB node, it may be configured that both the MT and the DU of the IAB node need to wait until the other party receives the time domain resource configuration information, and then the two pieces of time domain resource configuration information simultaneously take effect.

Scenario 2: An MT of a Parent IAB Node and a DU of a Child Node on a Same Link (1) When a DU of an IAB node receives time domain resource configuration information of an MT of a child node from an IAB donor, or sends the time domain resource configuration information of the MT of the child node to the child node, time domain resource configuration information of the DU of the IAB node takes effect. When the child node receives the time domain resource configuration information of the MT of the child node, the time domain resource configuration information of the MT of the child node takes effect.

FIG. 11B is a diagram of signaling exchange of a time domain resource format configuration method according to an embodiment of this application. As shown in FIG. 11B, the method includes the following steps.

S1201: An IAB donor sends time domain resource configuration information of a DU of an IAB node 1 to the IAB node 1.

S1202: The DU of the IAB node 1 generates time domain resource configuration information of an MT of an IAB node 2.

Optionally, in S1202, the DU of the IAB node 1 generates the time domain resource configuration information of the MT of the IAB node 2 based on the time domain resource configuration information of the DU of the IAB node 1. For example, an uplink time domain resource of the MT of the IAB node 2 is a part or all of uplink time domain resources of the DU of the IAB node 1, and a downlink time domain resource of the MT of the IAB node 2 is a part or all of downlink time domain resources of the DU of the IAB node 1.

Optionally, the DU of the IAB node 1 may further generate the time domain resource configuration information of the MT of the IAB node 2 based on time domain resource configuration information of a DU of the IAB node 2. For example, a duplex problem of simultaneous transmission and reception of the IAB node 2 is avoided. For details, refer to the content in S1003 and S1102, and details are not described herein again.

S1203: The IAB node 1 sends the time domain resource configuration information of the MT of the IAB node 2 to the IAB donor.

S1204: The IAB donor sends the time domain resource configuration information of the MT of the IAB node 2 to the MT of the IAB node 2.

When the DU of the IAB node 1 receives the time domain resource configuration information of the MT of the IAB node 2, or the DU of the IAB node 1 sends the time domain resource configuration information of the MT of the IAB node 2 to the IAB node 2, the time domain resource configuration information of the DU that is received by the IAB node 1 in S1201 takes effect.

When the MT of the IAB node 2 receives the time domain resource configuration information of the MT of the IAB node 2, the time domain resource configuration information of the MT of the IAB node 2 takes effect.

In S1204, the time domain resource configuration information of the MT of the IAB node 2 that is sent by the IAB donor to the MT of the IAB node 2 may be carried in an RRC message between the IAB donor and the IAB node 2. The RRC message may be encapsulated in an RRC container in an F1AP message sent by the IAB donor to the DU of the IAB node 1. In other words, when the IAB donor sends the time domain resource configuration information of the MT of the IAB node 2 to the MT of the IAB node 2, the IAB node 1 may learn that the IAB donor sends the time domain resource configuration information of the MT of the IAB node 2 to the IAB node 2 (but the IAB node 1 may not read the time domain resource configuration information). Therefore, it may be configured or defined that when the DU of the IAB node 1 receives the time domain resource configuration information of the MT of the IAB node 2, or when the DU of the IAB node 1 sends the time domain resource configuration information of the MT of the IAB node 2 to the IAB node 2, the time domain resource configuration information of the DU of the IAB node 1 takes effect. It may be configured or defined that when the MT of the IAB node 2 receives the time domain resource configuration information of the MT of the IAB node 2, the time domain resource configuration information of the MT of the IAB node 2 takes effect.

The following further provides a method M for determining downlink sending time of an IAB node according to an embodiment of this application. FIG. 12A, FIG. 12B, FIG. 12C, and FIG. 12D are schematic diagrams of a MAC CE according to embodiments of this application. The method includes the following steps.

M1: A parent node of an IAB node obtains a timing advance TA (Timing Advance) and a first time offset T_delta of the IAB node.

The timing advance TA is a timing advance between uplink sending time and downlink receiving time of the IAB node on a backhaul link on which the IAB node and the parent node are located, and the first time offset T_delta is a timing error of the parent node of the IAB node that is caused by a hardware reason, sending/receiving switching time, or the like.

M2: The parent node of the IAB node sends the timing advance TA and the first time offset T_delta to the IAB node.

Optionally, information about the TA may be carried in a random access response message or a TAC (timing advance command) MAC CE message.

Optionally, T_delta may be carried in a MAC CE message, and a new LCID needs to be predefined to correspondingly indicate a MAC CE of T_delta.

In addition, because a granularity of T_delta is related to a frequency, for a frequency range 1 (FR1) and a frequency range 2 (FR2), granularities of T_delta are respectively 64 Tc and 32 Tc, where Tc is a basic time unit in NR, and a specific value of Tc is $T_c=1/(\Delta f_{max} \cdot N_f)$ ($\Delta f_{max}=480 \cdot 10^3$ Hz, $N_f=4096$).

A range of T_delta is related to a subcarrier spacing (SCS). For different SCSs, 15 kHz, 30 kHz, 60 kHz, and 120 kHz correspond to different ranges of T_delta. The following table shows specific values.

| SCS [kHz] | Maximum value of T_delta [Tc] | Minimum value of T_delta[Tc] |
| --- | --- | --- |
| 15 | $N_{TA\ offset}/2 + 6256$ | $N_{TA\ offset}/2 - 70528$ |
| 30 | $N_{TA\ offset}/2 + 6128$ | $N_{TA\ offset}/2 - 35328$ |

| SCS [kHz] | Maximum value of T_delta [Tc] | Minimum value of T_delta[Tc] |
|---|---|---|
| 60 | $N_{TA,offset}/2 + 6032$ | $N_{TA,offset}/2 - 17664$ |
| 120 | $N_{TA,offset}/2 + 6032$ | $N_{TA,offset}/2 - 8816$ |

$N_{TA,offset}$ is a second time offset, and a value thereof may be obtained by reading system information or may be obtained in a predefined manner.

Therefore, when the parent node of the IAB sends T_delta to the IAB node, T_delta may be sent based on each frequency range and/or each SCS. Specifically, the MAC CE including T_delta may include indication information of the frequency range and/or indication information of the SCS.

The MAC CE of T_delta may be implemented in the following manners.

Implementation 1: The MAC CE Includes Only T_Delta.

Figure 12A:
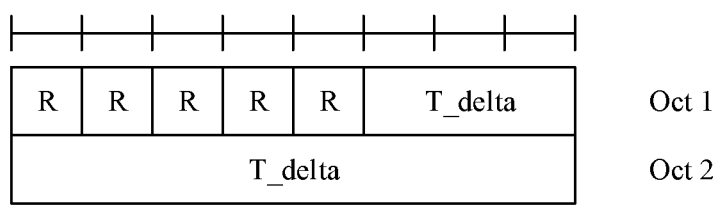
FIG. 12A is a schematic diagram of a MAC CE according to an embodiment of this application.

If the MAC CE includes only T_delta, the IAB node may determine, by obtaining a frequency range of the backhaul link between the IAB node and the parent node, information about a frequency range used to interpret T_delta. If different carriers of the backhaul link belong to only one frequency range, the frequency range used for T_delta is the frequency range of the backhaul link. If the different carriers of the backhaul link belong to two frequency ranges, it may be defined that the frequency range used for T_delta is a frequency band range of a frequency of a primary cell. For the SCS, if the IAB node supports only one SCS, an SCS used to interpret T_delta is the SCS. If the IAB node supports a plurality of SCSs, the SCS used to interpret T_delta may be a maximum SCS supported by the IAB node, a minimum SCS supported by the IAB node, an SCS of an uplink initial active bandwidth part of the IAB node, or an SCS of a downlink initial active bandwidth part of the IAB node. A specific format of the MAC CE is shown in FIG. 12A below. A T_delta field represents a value of T_delta, an R field represents a reserved bit, and a length of the T_delta field is merely an example rather than a limitation.

Implementation 2: The MAC CE Includes T_Delta and Information about a Frequency Range.

Figure 12B:
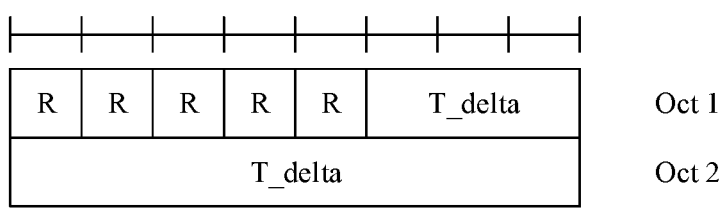
FIG. 12B is another schematic diagram of a MAC CE according to an embodiment of this application.

If the MAC CE includes T_delta and the information about the frequency range, for an SCS, if the IAB node supports only one SCS, an SCS used to interpret T_delta is the SCS. If the IAB node supports a plurality of SCSs, an SCS used to interpret T_delta may be a maximum SCS supported by the IAB node, a minimum SCS supported by the IAB node, an SCS of an uplink initial active bandwidth part of the IAB node, or an SCS of a downlink initial active bandwidth part of the IAB node. A specific format of the MAC CE is shown in FIG. 12B below. An FR field represents a frequency range, a T_delta field represents a value of T_delta, an R field represents a reserved bit, and a length of the T_delta field is merely an example rather than a limitation.

Implementation 3: The MAC CE Includes T_Delta and Information about an SCS.

Figure 12C:
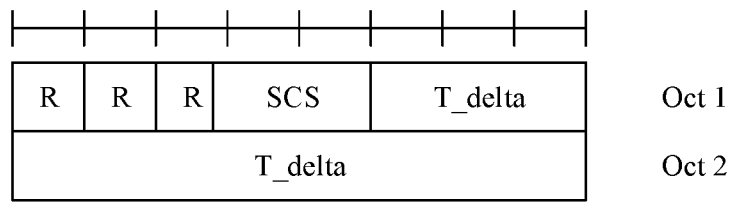
FIG. 12C is another schematic diagram of a MAC CE according to an embodiment of this application.

If the MAC CE includes T_delta and the SCS, the IAB node may determine, by obtaining a frequency range of the backhaul link between the IAB node and the parent node, information about a frequency range used to interpret T_delta. If different carriers of the backhaul link belong to only one frequency range, the frequency range used for T_delta is the frequency range of the backhaul link. If the different carriers of the backhaul link belong to two frequency ranges, it may be defined that the frequency range used for T_delta is a frequency band range of a frequency of a primary cell. A specific format of the MAC CE is shown in FIG. 12C below. An SCS field represents the information about the SCS, a T_delta field represents a value of T_delta, an R field represents a reserved bit, and a length of the T_delta field and a length of the SCS field are merely examples rather than limitations.

Implementation 4: The MAC CE Includes T_Delta, Information about a Frequency Range, and Information about an SCS.

Figure 12D:
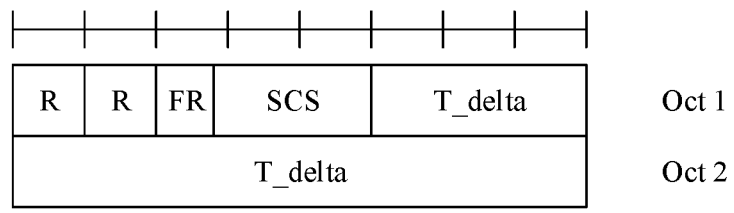
FIG. 12D is another schematic diagram of a MAC CE according to an embodiment of this application.

If the MAC CE includes T_delta, the information about the frequency range, and the information about the SCS, a specific format of the MAC CE is shown in FIG. 12D below. An FR field identifies a frequency range, an SCS field represents the information about the SCS, a T_delta field represents a value of T_delta, an R field represents a reserved bit, and a length of the T_delta field and a length of the SCS field are merely examples rather than limitations.

M3: The IAB node determines downlink sending timing between the IAB node and a child node based on the timing advance TA and the first time offset T_delta.

The downlink sending timing between the IAB node and the child node is: downlink receiving timing advance TA between the IAB node and the parent node/2+T_delta. The MAC CE is received for T_delta by using the IAB node, the information about the frequency range and/or the information about the SCS are/is determined based on information about a frequency range and/or information about an SCS that are/is indicated by the MAC CE or according to the method described in M2, and the value of T_delta is further determined. In an optional example of determining the value of T_delta, the IAB node may determine a granularity and a range of T_delta based on the information about the frequency range and the information about the SCS. The value of T_delta is: minimum value of T_delta+minimum value of the T_delta field*granularity.

In the method M3, the information about the frequency range and/or the information about the SCS are/is indicated in the MAC CE, so that the value of T_delta used by the IAB node to send synchronization timing in downlink is determined. This ensures downlink sending synchronization of the IAB node.

The foregoing describes the methods provided in embodiments of this application with reference to FIG. 4 to FIG. 12D. Content in the figures may be mutually referred and combined. The following describes communication apparatuses provided in embodiments of this application.

Figure 13:
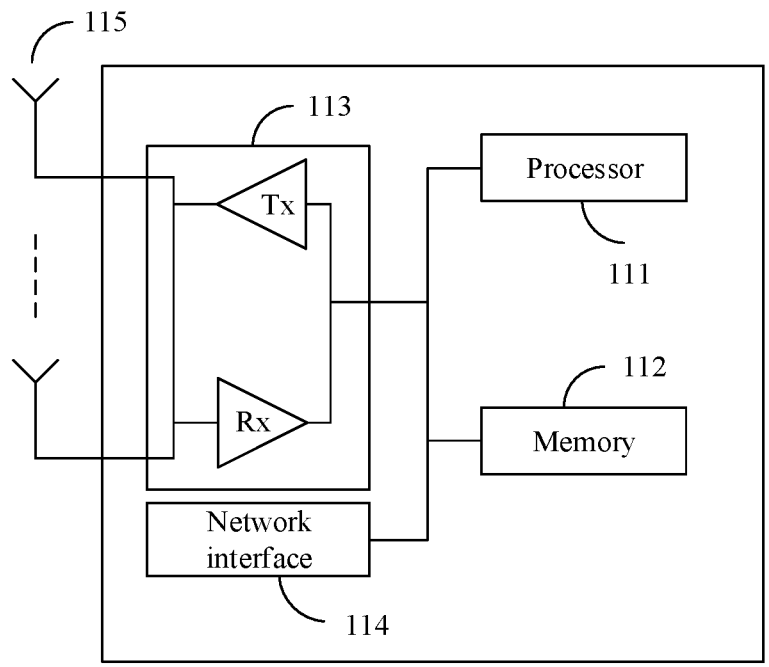
FIG. 13 is a schematic diagram of a structure of a network device according to an embodiment of this application.

FIG. 13 is a schematic diagram of a structure of a network device according to an embodiment of this application. For the wireless backhaul device, the access network device, the IAB node, or the IAB donor in embodiments of this application, refer to the structure in FIG. 13.

The network device includes at least one processor 111, at least one memory 112, at least one transceiver 113, at least one network interface 114, and one or more antennas 115. The processor 111, the memory 112, the transceiver 113, and the network interface 114 are connected, for example, through a bus. In this embodiment of this application, the connection may include various interfaces, transmission lines, buses, or the like. This is not limited in this embodiment. The antenna 115 is connected to the transceiver 113. The network interface 114 is configured to connect the network device to another communication device by using a communication link. For example, the network interface 114 may include a network interface between the access network device and a core network element, for example, an S1 interface. The network interface may include a network interface between the access network device and another network device (for example, another access network device or a core network element), for example, an X2 interface or an Xn interface.

The processor 111 is mainly configured to process a communication protocol and communication data, control the entire access network device, execute a software program, and process data of the software program, for example, configured to support the access network device in performing an action described in embodiments. The access network device may include a baseband processor and a central processing unit. The baseband processor is mainly configured to process the communication protocol and the communication data. The central processing unit is mainly configured to control the entire terminal device, execute the software program, and process the data of the software program. Functions of the baseband processor and the central processing unit may be integrated into the processor 111. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units to enhance processing capabilities of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the memory in a form of a software program, and the processor executes the software program to implement a baseband processing function.

The memory is mainly configured to store the software program and data. The memory 112 may exist independently, and is connected to the processor 111. Optionally, the memory 112 and the processor 111 may be integrated together, for example, integrated into a chip. The memory 112 can store program code that executes the technical solutions in embodiments of this application, and the processor 111 controls execution. Various types of computer program code that are executed may also be considered as drivers of the processor 111.

FIG. 13 shows only one memory and one processor. In an actual terminal device, there may be a plurality of processors and a plurality of memories. The memory may also be referred to as a storage medium, a storage device, or the like. The memory may be a storage element located on a same chip as the processor, namely, an on-chip storage element, or may be an independent storage element. This is not limited in this embodiment of this application.

The transceiver 113 may be configured to support receiving or sending of a radio frequency signal on an access link or a backhaul link. The transceiver 113 may be connected to the antenna 115. The transceiver 113 includes a transmitter Tx and a receiver Rx. Specifically, the one or more antennas 115 may receive the radio frequency signal. The receiver Rx in the transceiver 113 is configured to receive the radio frequency signal from the antenna, convert the radio frequency signal into a digital baseband signal or a digital intermediate frequency signal, and provide the digital baseband signal or the digital intermediate frequency signal for the processor 111, so that the processor 111 further processes the digital baseband signal or the digital intermediate frequency signal, for example, performs demodulation processing and decoding processing. In addition, the transmitter Tx in the transceiver 1113 is further configured to receive a modulated digital baseband signal or digital intermediate frequency signal from the processor 1111, convert the modulated digital baseband signal or digital intermediate frequency signal into a radio frequency signal, and send the radio frequency signal through the one or more antennas 1115. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals.

The transceiver may also be referred to as a transceiver unit, a transceiver, a transceiver apparatus, or the like. Optionally, a component that is in the transceiver unit and that is configured to implement a receiving function may be considered as a receiving unit. A component that is in the transceiver unit and that is configured to implement a sending function may be considered as a sending unit. That is, the transceiver unit includes the receiving unit and the sending unit. The receiving unit may also be referred to as a receiver, an input port, a receiver circuit, or the like. The sending unit may be referred to as a transmitter, a transmitter, a transmitter circuit, or the like.

When the network device in FIG. 13 is an IAB donor, the processor 111 may perform the steps performed by the IAB donor in FIG. 4 to FIG. 12D. The memory 112 may store a program or instructions, so that the processor 111 reads the program or the instructions to complete the method of the IAB donor. The transceiver 111 and the antenna 113 may send time domain resource format information or data to an IAB node, or receive time domain resource format information or data from the IAB node.

For example, the processor 111 may obtain time domain resource format information of an MT of an IAB node or time domain resource format information of a DU of the IAB node, the memory 112 may store the time domain resource format information of the MT of the IAB node or the time domain resource format information of the DU of the IAB node, and the transceiver 113 and the antenna 115 may send the time domain resource format information of the MT of the IAB node or the time domain resource format information of the DU of the IAB node to a next-hop IAB node. The time domain resource format information of the MT of the IAB node or the time domain resource format information of the DU of the IAB node arrives at the MT or the DU of the IAB node through multi-hop transmission For example, as shown in FIG. 4, an IAB donor may obtain time domain resource format information of an MT of an IAB node 4. The IAB donor first sends the time domain resource format information of the MT of the IAB node 4 to an IAB node 1 by using the transceiver 113 and the antenna 115, and then the IAB node 1 sends the time domain resource format information of the MT of the IAB node 4 to an IAB node 2 by using the transceiver 113 and the antenna 115. The IAB node 2 then sends the time domain resource format information of the MT of the IAB node 4 to the IAB node 4 by using the transceiver 113 and the antenna 115, and then the IAB node 4 receives the time domain resource format information of the MT of the IAB node 4.

When the network device in FIG. 13 is an IAB node, the processor 111 may perform the steps performed by the IAB node in FIG. 4 to FIG. 12D and in the method M, for example, the steps performed by the IAB node 1, the IAB node 2, or the IAB node 4. The memory 112 may store a program or instructions, so that the processor 111 reads the program or the instructions to complete the method of the IAB node. The transceiver 111 and the antenna 113 may send time domain resource format information or data to an IAB donor, or receive time domain resource format information or data from the IAB donor.

For example, when the network device is an IAB node 2, the transceiver 113 and the antenna 115 may receive time domain resource format information of a DU of the IAB node 2 (S606 or S806) or time domain resource format information of an MT of the IAB node 2 (S604 or S804) from an IAB donor. The processor 111 may generate time domain resource format information of an MT of a child node IAB node 4 (S607 or S807), and the transceiver 113 and the antenna 115 may further send the time domain resource format information of the MT of the IAB node 4 to a IAB donor (S608 or S808). The transceiver 113 and the antenna 115 may further send uplink data to an IAB node 1 (S610 or S812), send downlink data to the IAB node 4 (S611 or S813), and receive downlink data from the IAB node 1 (S612 or S810), or receive uplink data from the IAB node 4 (S613 or S811).

Figure 14:
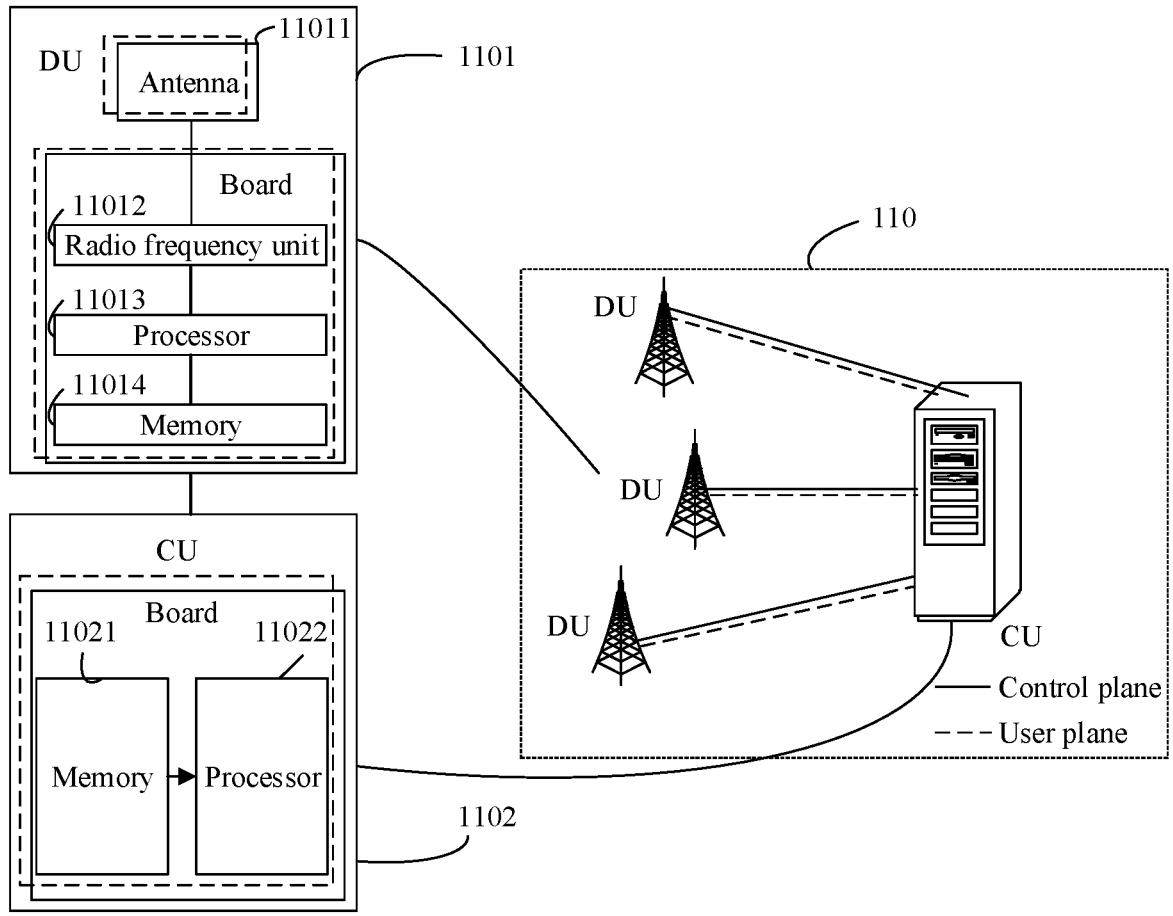
FIG. 14 is a schematic diagram of a structure of another network device according to an embodiment of this application.

FIG. 14 is a schematic diagram of a structure of another network device according to an embodiment of this application, for example, may be a schematic diagram of a structure of an access network device or an IAB donor. When a base station 110 is an IAB donor, a DU included in the base station may be a donor DU, and a CU included in the base station may be a donor CU. As shown in FIG. 14, the network device is applied to the systems shown in FIG. 1 to FIG. 3A, and performs a function of the IAB donor in the foregoing method embodiments. The network device 110 may include one or more DUs 1101 and one or more CUs 1102. The DU 1101 may include at least one antenna 11011, at least one radio frequency unit 11012, at least one processor 11013, and at least one memory 11014. The DU 1101 is mainly configured to: receive and send a radio frequency signal, perform conversion between a radio frequency signal and a baseband signal, and perform partial baseband processing. The CU 1102 may include at least one processor 11022 and at least one memory 11021. The CU 1102 and the DU 1101 may communicate with each other through an interface. A control plane interface may be Fs-C, for example, F1-C, and a user plane interface may be Fs-U, for example, F1-U.

The CU 1102 is mainly configured to: perform baseband processing, control the base station, and the like. The DU 1101 and the CU 1102 may be physically disposed together, or may be physically disposed separately, that is, a distributed base station. The CU 1102 is a control center of the base station, may also be referred to as a processing unit, and is mainly configured to complete a baseband processing function. For example, the CU 1102 may be configured to control the base station to perform an operation procedure related to the network device in the foregoing method embodiments.

Optionally, baseband processing on the CU and the DU may be divided based on protocol layers of a wireless network. For example, functions of a packet data convergence protocol (PDCP) layer and a protocol layer above the PDCP layer are set in the CU. Functions of protocol layers below the PDCP, such as a radio link control (RLC) layer and a media access control (MAC) layer, are set in the DU. For another example, the CU implements functions of a radio resource control (RRC) layer and a packet data convergence protocol (PDCP) layer. The DU implements functions of a radio link control (RLC) layer, a media access control (MAC) layer, and a physical (PHY) layer.

In addition, optionally, the base station 110 may include one or more radio frequency units (RUs), one or more DUs, and one or more CUs. The DU may include the at least one processor 11013 and the at least one memory 11014, the RU may include the at least one antenna 11011 and the at least one radio frequency unit 11012, and the CU may include the at least one processor 11022 and the at least one memory 11021.

In an example, the CU 1102 may include one or more boards, and a plurality of boards may jointly support a radio access network (for example, a 5G network) of a single access standard, or may separately support radio access networks (such as an LTE network, a 5G network, or another network) of different access standards. The memory 11021 and the processor 11022 may serve one or more boards. In other words, a memory and a processor may be deployed on each board. Alternatively, a plurality of boards may share a same memory and a same processor. In addition, a necessary circuit may further be deployed on each board. The DU 1101 may include one or more boards, and a plurality of boards may jointly support a radio access network (for example, a 5G network) of a single access standard, or may separately support radio access networks (such as an LTE network, a 5G network, or another network) of different access standards. The memory 11014 and the processor 11013 may serve one or more boards. In other words, a memory and a processor may be deployed on each board. Alternatively, a plurality of boards may share a same memory and a same processor. In addition, a necessary circuit may further be deployed on each board.

Optionally, the method performed by the IAB donor in this embodiment of this application may be performed by a CU of the IAB donor.

Optionally, the processor 11022 of the CU 1102 may execute a program or instructions in the memory 11021, to perform the method of the IAB donor in FIG. 4 to FIG. 12D. The memory 11021 may store data or instructions, to enable the processor 11022 of the CU 1102 to perform the method of the IAB donor in FIG. 4 to FIG. 12D.

For example, the CU 1102 may obtain time domain resource format information of an IAB node and send the time domain resource format information to the DU 1101, and the DU 1101 sends the time domain resource format information to a next-hop IAB node or a terminal by using the radio frequency unit 11012 and the antenna 11011. Alternatively, the DU 1101 may receive the time domain resource format information from the IAB node by using the radio frequency unit 11012 and the antenna 11011, and then send the time domain resource format information to the CU 1102.

Figure 15:
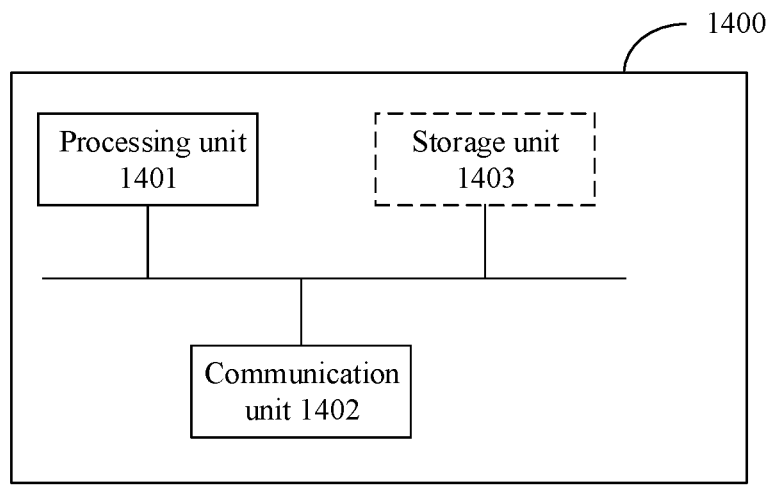
FIG. 15 is a schematic diagram of a structure of a communication apparatus according to an embodiment of this application.

FIG. 15 is a schematic diagram of a structure of a communication apparatus according to an embodiment of this application. The communication apparatus 1400 may perform the method described in the foregoing method embodiments. For details, refer to the descriptions in the foregoing method embodiments. The communication apparatus 1400 may be used in a communication device, a circuit, a hardware component, or a chip. For example, the communication apparatus 1400 may be an IAB donor, a chip in the IAB donor, a donor CU, a chip in the donor CU, an IAB node, or a chip in the IAB node.

As shown in FIG. 15, the communication apparatus 1400 includes a processing unit 1401 and a communication unit 1402. Optionally, the communication apparatus 1400 further includes a storage unit 1403.

The processing unit 1401 may be an apparatus having a processing function, and may include one or more processors. The processor may be a general-purpose processor, a dedicated processor, or the like. The processor may be a baseband processor or a central processing unit. The baseband processor may be configured to process a communication protocol and communication data. The central processing unit may be configured to: control the apparatus (for example, a base station, a terminal, or a chip), execute a software program, and process data of the software program.

The communication unit 1402 may be an apparatus for inputting (receiving) or outputting (sending) a signal, and is configured to perform signal transmission with another network device or another component in a device.

The storage unit 1403 may be an apparatus having a storage function, and may include one or more memories.

Optionally, the processing unit 1401, the communication unit 1402, and the storage unit 1403 are connected by using a communication bus.

Optionally, the storage unit 1403 may exist independently, and is connected to the processing unit 1401 by using the communication bus. The storage unit 1403 may alternatively be integrated into the processing unit 1401.

The communication apparatus 1400 may be the IAB donor in embodiments of this application. FIG. 13 may be a schematic diagram of a structure of the IAB donor. Optionally, the communication unit 1402 may include a transceiver 113 and an antenna 115. Optionally, the communication unit 1402 may further include a network interface 114.

The communication apparatus 1400 may be the chip in the IAB donor in this embodiment of this application. The communication unit 1402 may be an input/output interface, a pin, a circuit, or the like. The storage unit 1403 may be a register, a cache, a RAM, or the like, and the storage unit 1403 may be integrated together with the processing unit 1401. The storage unit 1403 may be a ROM or another type of static storage device that can store static information and instructions, and the storage unit 1403 may be independent of the processing unit 1401.

The communication apparatus 1400 may be the donor CU in embodiments of this application. FIG. 14 may be a schematic diagram of a structure of the donor CU. Optionally, the communication unit 1402 may be an interface between the donor CU and a donor DU.

The communication apparatus 1400 may be the chip in the donor CU in this embodiment of this application. The communication unit 1402 may be an input/output interface, a pin, a circuit, or the like. The storage unit 1403 may be a register, a cache, a RAM, or the like, and the storage unit 1403 may be integrated together with the processing unit 1401. The storage unit 1403 may be a ROM or another type of static storage device that can store static information and instructions, and the storage unit 1403 may be independent of the processing unit 1401.

When the communication apparatus 1400 is the IAB donor, the donor CU, the chip in the IAB donor, or the chip in the donor CU, the processing unit 1401 may complete the method performed by the IAB donor in the foregoing embodiment.

In a possible design, the processing unit 1401 may include instructions, and the instructions may be run on a processor, so that the communication apparatus 1400 performs the method of the IAB donor in the foregoing embodiment.

In another possible design, the storage unit 1403 stores instructions, and the instructions may be run on the processing unit 1401, so that the communication apparatus 1400 performs the method of the IAB donor in the foregoing embodiment. Optionally, the storage unit 1403 may further store data. Optionally, the processing unit 1401 may also store instructions and/or data.

For example, the processing unit 1401 may obtain the time domain resource format information in FIG. 6A and FIG. 6B to FIG. 12D, and the communication unit 1402 may send or receive the time domain resource format information. For details, refer to related content of the IAB donor in FIG. 6A and FIG. 6B to FIG. 12D. Details are not described herein again.

The communication apparatus 1400 may be the IAB node in embodiments of this application, for example, the IAB node 1, the IAB node 2, or the IAB node 4. The structure of the IAB node may be shown in FIG. 13. Optionally, the communication unit 1402 of the apparatus 1400 may include a transceiver and an antenna of the IAB node.

The communication apparatus 1400 may be the chip in the IAB node in this embodiment of this application. The communication unit 1402 may be an input/output interface, a pin, a circuit, or the like. The storage unit 1403 may be a register, a cache, a RAM, or the like, and the storage unit 1403 may be integrated together with the processing unit 1401. The storage unit 1403 may be a ROM or another type of static storage device that can store static information and instructions, and the storage unit 1403 may be independent of the processing unit 1401.

When the communication apparatus 1400 is the IAB node or the chip in the IAB node, the processing unit 1401 may complete the method performed by the IAB node in the foregoing embodiment.

In a possible design, the processing unit 1401 may include instructions, and the instructions may be run on a processor, so that the communication apparatus 1400 performs the method of the IAB node in the foregoing embodiment.

In another possible design, the storage unit 1403 stores instructions, and the instructions may be run on the processing unit 1401, so that the communication apparatus 1400 performs the method of the IAB node in the foregoing embodiment. Optionally, the storage unit 1403 may further store data. Optionally, the processing unit 1401 may also store instructions and/or data.

For example, the communication unit 1402 may receive the time domain resource format information from the IAB donor or send the time domain resource format information to the IAB donor, and the processing unit 1401 may generate the time domain resource format information of the MT of the child node. For details, refer to related content of the IAB node in FIG. 6A and FIG. 6B to FIG. 12D. Details are not described herein again.

The foregoing describes a method flowchart in this embodiment of this application. It should be understood that the donor CU may have a function unit (means) corresponding to a step of the method or procedure of the donor CU, and the donor DU may have a function unit corresponding to a step of the method or procedure of the donor DU. One or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedure.

The processor in this application may include but is not limited to at least one of the following computing devices that run software: a central processing unit (CPU), a microprocessor, a digital signal processor (DSP), a microcontroller unit (MCU), or an artificial intelligence processor. Each computing device may include one or more cores configured to perform an operation or processing by executing software instructions. The processor may be an independent semiconductor chip, or may be integrated with another circuit to form a semiconductor chip. For example, the processor and another circuit (for example, an encoding/decoding circuit, a hardware acceleration circuit, or various buses and interface circuits) may form a SoC (system-on-a-chip). Alternatively, the processor may be integrated into an ASIC as a built-in processor of the ASIC, and the ASIC integrated with the processor may be independently packaged or may be packaged with another circuit. In addition to the core configured to perform an operation or processing by executing software instructions, the processor may further include a necessary hardware accelerator, for example, a field programmable gate array (FPGA), a PLD (programmable logic device), or a logic circuit that implements a dedicated logic operation.

The memory in embodiments of this application may include at least one of the following types: a read-only memory (ROM) or another type of static storage device that can store static information and instructions, or a random access memory (RAM) or another type of dynamic storage device that can store information and instructions, or may be an electrically erasable programmable read-only memory (EEPROM). In some scenarios, the memory may alternatively be a compact disc read-only memory (CD-ROM) or another compact disc storage medium, an optical disc storage medium(including a compact disc, a laser disc, an optical disc, a digital versatile disc, a Blu-ray disc, and the like), a magnetic disk storage medium or another magnetic storage device, or any other medium that can be configured to carry or store expected program code in a form of instructions or a data structure and that can be accessed by a computer. However, the memory is not limited thereto.

The bus may further include a power bus, a control bus, a status signal bus, and the like, in addition to a data bus. However, for clear description, various types of buses in the figures are marked as the bus.

In an implementation process, the steps in the foregoing methods may be implemented by using a hardware integrated logic circuit in the processor, or by using instructions in a form of software. The steps in the methods disclosed with reference to embodiments of this application may be directly performed and completed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

According to the method provided in embodiments of this application, an embodiment of this application further provides a system, including the foregoing apparatus and one or more network devices.

It should be further understood that, "first", "second", "third", "fourth", and various numbers in this specification are merely used for differentiation for ease of description, and are not intended to limit the scope of embodiments of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in embodiments of this application, sequence numbers of the foregoing processes do not mean execution sequences. The execution sequences of the processes should be determined based on functions and internal logic of the processes, and should not constitute any limitation to implementation processes of embodiments of this application.

A person of ordinary skill in the art may be aware that, various illustrative logical blocks and steps that are described with reference to embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, the apparatus, and the method may be implemented in other manners. For example, the foregoing apparatus embodiments are merely examples. For example, division into the units is merely logical function division. During actual implementation, another division manner may be used. A plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in an electrical, a mechanical, or another similar form.

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A time domain resource format configuration method, comprising:
    obtaining, by an integrated access and backhaul (IAB) donor, first time domain resource format information, wherein the first time domain resource format information indicates that time domain resources in a first periodicity are distributed in an order of an uplink time domain resource, a flexible time domain resource, and a downlink time domain resource; and
    sending, by the IAB donor, the first time domain resource format information to a first IAB node,
    wherein the first time domain resource format information comprises a bitmap, the bitmap comprises at least one bit, the at least one bit is in one-to-one correspondence with at least one periodicity, and each bit indicates that time domain resources in a periodicity corresponding to the bit are distributed in an order of a downlink time domain resource, a flexible time domain resource, and an uplink time domain resource or distributed in the order of an uplink time domain resource, a flexible time domain resource, and a downlink time domain resource; and
    wherein the at least one periodicity comprises the first periodicity, the at least one bit comprises a first bit, and the first bit indicates that the time domain resources in the first periodicity are distributed in the order of an uplink time domain resource, a flexible time domain resource, and a downlink time domain resource.

2. The method according to claim 1, wherein the first time domain resource format information indicates that time domain resources in each of T1 consecutive periodicities are distributed in an order of a downlink time domain resource, a flexible time domain resource, and an uplink time domain resource, and that time domain resources in each of T2 consecutive periodicities immediately following the T1 consecutive periodicities are distributed in the order of an uplink time domain resource, a flexible time domain resource, and a downlink time domain resource, the T2 consecutive periodicities comprise the first periodicity, and both T1 and T2 are positive integers greater than or equal to 1.

3. The method according to claim 2, wherein the first time domain resource format information further comprises one or both of a parameter T1 and a parameter T2.

4. The method according to claim 1, wherein the first time domain resource format information comprises indication information of the first periodicity, indication information of a length of the uplink time domain resource, indication information of a length of the downlink time domain resource, and uplink priority indication information, and the uplink priority indication information indicates that the uplink time domain resource is at the beginning of the first periodicity.

5. The method according to claim 1, wherein the first time domain resource format information comprises indication information of the first periodicity, indication information of a length of the uplink time domain resource, and indication information of a length of the downlink time domain resource: the indication information of the length of the uplink time domain resource indicates the length of the uplink time domain resource, and the uplink time domain resource is at the beginning of the first periodicity; and the indication information of the length of the downlink time domain resource indicates the length of the downlink time domain resource, and the downlink time domain resource is at the end of the first periodicity.

6. The method according to claim 1, wherein the first time domain resource format information further indicates a resource type of one or more of the uplink time domain resource, the flexible time domain resource, and the downlink time domain resource in the first periodicity, and the resource type comprises a hard type, a soft type, or a not-available (N/A) type.

7. The method according to claim 1, wherein the uplink time domain resource in the time domain resources in the first periodicity comprises X consecutive uplink symbols, the flexible time domain resource comprises Y consecutive flexible symbols, and the downlink time domain resource comprises Z consecutive downlink symbols, wherein X, Y, and Z are all integers greater than or equal to 0.

8. The method according to claim 1, wherein the first time domain resource format information is time domain resource format information of a mobile terminal (MT) of the first IAB node, the first time domain resource format information indicates that time domain resources of the MT of the first IAB node are distributed in the order of an uplink time domain resource, a flexible time domain resource, and a downlink time domain resource; and
    wherein the sending, by the IAB donor, the first time domain resource format information to the first IAB node comprises:
    sending, by the IAB donor, the first time domain resource format information to the MT of the first IAB node.

9. The method according to claim 8, further comprising:
    receiving, by the IAB donor, the first time domain resource format information from a distributed unit (DU) of a parent node of the first IAB node.

10. A time domain resource format configuration method, comprising:
    receiving, by a first integrated access and backhaul (IAB) node, first time domain resource format information from an IAB donor, wherein the first time domain resource format information indicates that time domain resources in a first periodicity are distributed in an order of an uplink time domain resource, a flexible time domain resource, and a downlink time domain resource; and determining, by the first IAB node, that the time domain resources in the first periodicity are distributed in the order of an uplink time domain resource, a flexible time domain resource, and a downlink time domain resource, wherein the first time domain resource format information comprises a bitmap, the bitmap comprises at least one bit, the at least one bit is in one-to-one correspondence with at least one periodicity, and each bit indicates that time domain resources in a periodicity corresponding to the bit are distributed in an order of a downlink time domain resource, a flexible time domain resource, and an uplink time domain resource or distributed in the order of an uplink time domain resource, a flexible time domain resource, and a downlink time domain resource; and wherein the at least one periodicity comprises the first periodicity, the at least one bit comprises a first bit, and the first bit indicates that the time domain resources in the first periodicity are distributed in the order of an uplink time domain resource, a flexible time domain resource, and a downlink time domain resource.

11. The method according to claim 10, wherein the first time domain resource format information indicates that time domain resources in each of T1 consecutive periodicities are distributed in an order of a downlink time domain resource, a flexible time domain resource, and an uplink time domain resource, and that time domain resources in each of T2 consecutive periodicities immediately following the T1 consecutive periodicities are distributed in the order of an uplink time domain resource, a flexible time domain resource, and a downlink time domain resource, the T2 consecutive periodicities comprise the first periodicity, and both T1 and T2 are positive integers greater than or equal to 1.

12. The method according to claim 11, wherein the first time domain resource format information further comprises one or both of a parameter T1 and a parameter T2.

13. The method according to claim 10, wherein the first time domain resource format information comprises indication information of the first periodicity, indication information of a length of the uplink time domain resource, indication information of a length of the downlink time domain resource, and uplink priority indication information, and the uplink priority indication information indicates that the uplink time domain resource is at the beginning of the first periodicity.

14. The method according to claim 10, wherein the first time domain resource format information comprises indication information of the first periodicity, indication information of a length of the uplink time domain resource, and indication information of a length of the downlink time domain resource: the indication information of the length of the uplink time domain resource indicates the length of the uplink time domain resource, and the uplink time domain resource is at the beginning of the first periodicity; and the indication information of the length of the downlink time domain resource indicates the length of the downlink time domain resource, and the downlink time domain resource is at the end of the first periodicity.

15. The method according to claim 10, wherein the first time domain resource format information further indicates a resource type of one or more of the uplink time domain resource, the flexible time domain resource, and the downlink time domain resource in the first periodicity, and the resource type comprises a hard type, a soft type, or a not-available (N/A) type.

16. The method according to claim 10, wherein the uplink time domain resource in the time domain resources in the first periodicity comprises X consecutive uplink symbols, the flexible time domain resource comprises Y consecutive flexible symbols, and the downlink time domain resource comprises Z consecutive downlink symbols, wherein X, Y, and Z are all integers greater than or equal to 0.

17. The method according to claim 10, wherein the first time domain resource format information is time domain resource format information of a mobile terminal (MT) of the first IAB node, the first time domain resource format information indicates that time domain resources of the MT of the first IAB node are distributed in the order of an uplink time domain resource, a flexible time domain resource, and a downlink time domain resource; and wherein the receiving, by the first IAB node, the first time domain resource format information from the IAB donor comprises:

receiving, by the MT of the first IAB node, the first time domain resource format information from the IAB donor.

18. The method according to claim 17, further comprising:

receiving, by a distributed unit (DU) of the first IAB node, second time domain resource format information from the IAB donor, wherein the second time domain resource format information indicates that time domain resources of the DU of the first IAB node in the first periodicity are distributed in the order of a downlink time domain resource, a flexible time domain resource, and an uplink time domain resource.

* * * * *